(12) United States Patent  
Pierce et al.

(10) Patent No.: US 10,220,456 B2  
(45) Date of Patent: Mar. 5, 2019

(54) LARGE DIAMETER TRAVELLING PIPE CUTTER

(71) Applicant: ILLINOIS TOOL WORKS INC., Glenview, IL (US)

(72) Inventors: Kenneth R. Pierce, Arlington Heights, IL (US); Michael W. Gearhart, Prospect Heights, IL (US); Alexander S. Giberman, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 160 days.

(21) Appl. No.: 15/232,348

(22) Filed: Aug. 9, 2016

(65) Prior Publication Data

US 2017/0043418 A1   Feb. 16, 2017

Related U.S. Application Data

(60) Provisional application No. 62/203,049, filed on Aug. 10, 2015.

(51) Int. Cl.
*B23D 45/12* (2006.01)
*B23C 3/12* (2006.01)
(Continued)

(52) U.S. Cl.
CPC ............ *B23D 45/126* (2013.01); *B23C 3/122* (2013.01); *B23Q 9/0021* (2013.01); *B24B 27/0616* (2013.01)

(58) Field of Classification Search
CPC ......... B23D 45/126; B23C 3/122; B23C 9/00; B23C 3/18; B23C 3/007; B24B 27/0616; B23Q 9/0021; F16L 55/18
(Continued)

(56) References Cited

U.S. PATENT DOCUMENTS 760,128 A    5/1904  Jackson  
1,183,158 A  5/1916  Auble  
(Continued)

FOREIGN PATENT DOCUMENTS

CH    618370 A5    7/1980  
CN   2328487 Y    7/1999  
(Continued)

OTHER PUBLICATIONS

Machine translation of CH618370 from Foreign Patent Documents No. 1.
(Continued)

*Primary Examiner* — Ghassem Alie  
(74) *Attorney, Agent, or Firm* — Klintworth & Rozenblat IP LLP

(57) ABSTRACT

According to an aspect of the present disclosure, a low profile travelling pipe cutter is provided which is adapted to perform at least one of cutting and beveling a hollow vessel while traveling around the vessel using a cutting tool mounted thereon. The pipe cutter includes inner and outer carriages, a capstan assembly attached to the outer carriage to which a feed cable is attached, and rollers attached to the outer carriage to which a tension cable is attached. The force adjustment assembly changes the vertical position of the outer carriage relative to the inner carriage to compensate for the pipe cutter going inwardly and outwardly as it travels around a hollow vessel in order to maintain constant pressure caused by the lever tension interface. A guard assembly is provided for covering and uncovering the cutting tool during cutting.

28 Claims, 25 Drawing Sheets

(51) Int. Cl.
*B24B 27/06* (2006.01)
*B23Q 9/00* (2006.01)

(58) Field of Classification Search
USPC .......... 83/745, 744, 487, 54, 743, 872, 873; 30/92.5, 92, 394, 372
See application file for complete search history.

(56) References Cited

U.S. PATENT DOCUMENTS

| | | | |
|---|---|---|---|
| 1,495,067 A | 5/1924 | Conklin | |
| 1,796,691 A | 3/1931 | Jansen | |
| 1,985,541 A | 12/1934 | Hoefer | |
| 2,230,569 A | 2/1941 | Howard et al. | |
| 2,291,395 A | 7/1942 | Levey | |
| 2,396,289 A | 3/1946 | Ross | |
| 2,716,280 A | 8/1955 | Ruhe | |
| 2,842,238 A | 7/1958 | Shaw et al. | |
| 2,974,694 A | 3/1961 | Mattila et al. | |
| 3,135,850 A | 6/1964 | Scheller et al. | |
| 3,157,945 A | 11/1964 | Picking | |
| 3,168,002 A | 2/1965 | Walling | |
| 3,555,239 A | 1/1971 | Kerth | |
| 3,572,669 A | 3/1971 | Brand | |
| 3,604,612 A | 9/1971 | Miller et al. | |
| 3,645,308 A | 2/1972 | Nilsson | |
| 3,688,615 A | 9/1972 | Protze et al. | |
| 3,702,913 A | 11/1972 | Kazluaskas et al. | |
| 3,704,516 A | 12/1972 | Ono | |
| 3,760,664 A | 9/1973 | Gossling | |
| 3,807,047 A | 4/1974 | Sherer et al. | |
| 3,840,170 A | 10/1974 | Arikawa et al. | |
| 3,915,246 A | 10/1975 | Sheshtawy | |
| 3,942,248 A | 3/1976 | Scherer et al. | |
| 3,943,626 A | 3/1976 | Williams | |
| 4,048,720 A | 9/1977 | Wheeler | |
| 4,084,463 A | 4/1978 | Kanbara et al. | |
| 4,091,514 A | 5/1978 | Motes-Conners et al. | |
| 4,185,525 A | 1/1980 | Sherer | |
| 4,205,573 A | 6/1980 | D'Angelo et al. | |
| 4,206,664 A | 6/1980 | Miyagawa | |
| 4,213,357 A | 7/1980 | Lively et al. | |
| 4,318,391 A | 3/1982 | Wachs et al. | |
| 4,322,262 A | 3/1982 | Cottam | |
| 4,359,820 A | 11/1982 | Wheeler et al. | |
| 4,397,202 A | 8/1983 | Mayfield et al. | |
| 4,397,363 A | 8/1983 | Fuller | |
| 4,418,591 A | 12/1983 | Astle | |
| 4,440,383 A | 4/1984 | Dearman | |
| 4,490,909 A | 1/1985 | Wachs et al. | |
| 4,499,934 A | 2/1985 | Rautio | |
| 4,543,861 A | 10/1985 | Kwech et al. | |
| 4,655,108 A | 4/1987 | Galos | |
| 4,663,844 A | 5/1987 | Vegge | |
| 4,677,884 A | 7/1987 | Kwech et al. | |
| 4,682,919 A | 7/1987 | Mitchell | |
| 4,739,685 A | 4/1988 | Ricci | |
| 4,757,977 A | 7/1988 | Krieg | |
| D297,144 S | 8/1988 | Kazlauskas | |
| 4,762,038 A | 8/1988 | Olson | |
| 4,763,413 A | 8/1988 | Rothenberger | |
| 4,767,048 A | 8/1988 | Kimbrough et al. | |
| 4,791,842 A | 12/1988 | Olson | |
| 4,909,114 A | 3/1990 | Astle | |
| 4,939,964 A | 7/1990 | Ricci | |
| 4,944,205 A | 7/1990 | Ricci | |
| 5,054,342 A | 10/1991 | Swiatowy et al. | |
| 5,159,756 A | 11/1992 | McGuire | |
| 5,173,013 A | 12/1992 | Gorse | |
| 5,349,751 A * | 9/1994 | Fahr ...................... | B23D 45/126 30/101 |
| 5,361,659 A | 11/1994 | Hanson | |
| 5,368,399 A | 11/1994 | Tremblay | |
| 5,429,021 A | 7/1995 | Astle et al. | |
| 5,520,734 A | 5/1996 | Taylor | |
| 5,549,024 A | 8/1996 | Ricci | |
| 5,596,914 A | 1/1997 | Liao | |
| 5,992,277 A | 11/1999 | Dalseide | |
| 6,141,876 A | 11/2000 | Hamm | |
| 6,146,067 A | 11/2000 | Owens | |
| 6,938,313 B2 | 9/2005 | Viola et al. | |
| 6,966,731 B2 | 11/2005 | VanderPol et al. | |
| 7,089,668 B1 | 8/2006 | Whitehead | |
| 7,270,505 B2 | 9/2007 | VanderPol et al. | |
| 7,578,643 B1 | 8/2009 | Karow | |
| 7,811,034 B1 | 10/2010 | Karow | |
| 7,992,473 B2 | 8/2011 | Marple et al. | |
| 8,181,555 B2 | 5/2012 | Clements et al. | |
| 8,720,070 B2 | 5/2014 | Sterner | |
| 8,826,785 B2 | 9/2014 | Wang et al. | |
| 8,997,611 B1 | 4/2015 | Walton et al. | |
| 9,574,697 B1 * | 2/2017 | Wisehart ................ | F16L 55/18 |
| 2004/0149103 A1 | 8/2004 | Rundell et al. | |
| 2004/0234352 A1 * | 11/2004 | Vanderpol .............. | B23C 3/122 409/178 |
| 2008/0005907 A1 | 1/2008 | Scheffer | |
| 2008/0216325 A1 | 9/2008 | Loporchio | |
| 2010/0162860 A1 | 7/2010 | Hall et al. | |
| 2010/0166516 A1 | 7/2010 | Karow | |
| 2014/0026731 A1 * | 1/2014 | Pierce ..................... | B26D 3/16 83/744 |
| 2014/0096655 A1 | 4/2014 | Coakley | |
| 2014/0190322 A1 | 7/2014 | Pierce et al. | |
| 2014/0196582 A1 | 7/2014 | Pierce et al. | |
| 2015/0090094 A1 | 4/2015 | Arkwright et al. | |
| 2015/0096421 A1 | 4/2015 | Pierce et al. | |
| 2016/0228960 A1 * | 8/2016 | Kremsler ............ | B23D 45/126 |

FOREIGN PATENT DOCUMENTS

| | | |
|---|---|---|
| CN | 201712021 U | 1/2011 |
| CN | 101970161 A | 2/2011 |
| CN | 201728411 U | 2/2011 |
| CN | 201768951 U | 3/2011 |
| CN | 202527782 U | 11/2012 |
| CN | 202763159 U | 3/2013 |
| CN | 103416842 A | 12/2013 |
| CN | 103596871 A | 2/2014 |
| CN | 103624318 A | 3/2014 |
| CN | 203925294 U | 11/2014 |
| CN | 104785838 A | 7/2015 |
| DE | 1715114 U | 1/1956 |
| DE | 29721223 U1 | 4/1998 |
| EP | 0826467 A1 | 3/1998 |
| EP | 1418030 A1 | 5/2004 |
| EP | 2 213 399 A1 | 8/2010 |
| GB | 139326 A | 3/1920 |
| JP | 355125919 A | 9/1980 |
| JP | 58102601 A | 6/1983 |
| JP | 63084812 A | 4/1988 |
| JP | 2006150497 A | 6/2006 |
| KR | 20140008967 A | 1/2014 |
| NL | 8401651 A | 12/1985 |
| WO | 2015063750 A1 | 5/2015 |

OTHER PUBLICATIONS

Machine translation of DE29721223 from Foreign Patent Documents No. 3.
Machine translation of DE1715114 from Foreign Patent Documents No. 4.
Machine translation of JP58-102601 from Foreign Patent Documents No. 6.
Machine translation of JP63-84812 from Foreign Patent Documents No. 7.
Machine translation of NL8401651 abstract only from Foreign Patent Documents No. 8.
International Search Report and Written Opinion from corresponding International Application PCT/US16/46416 dated Nov. 7, 2016, 12 pages.
International Preliminary Report on Patentability for corresponding international patent application No. PCT/US2016/046175 dated Feb. 22, 2018, 14 pages.

(56) References Cited

OTHER PUBLICATIONS

International Search Report and Written Opinion for PCT/US2016/046690 dated Oct. 24, 2016, 14 pages.
Partial International Search Report and Written Opinion from corresponding International Application PCT/US2016/046175 dated Dec. 5, 2016, 3 pages.
International Search Report from corresponding International Application PCT/US2016/046175 dated Jan. 30, 2017, 8 pages.
Written Opinion from corresponding International Application PCT/US2016/046175 dated Jan. 30, 2017, 12 pages.
Office Action issued for CA 2,995,194 dated Oct. 26, 2018, 4 pages.

* cited by examiner

LARGE DIAMETER TRAVELLING PIPE CUTTER

RELATED APPLICATIONS

This application claims the domestic priority of U.S. Provisional Application Ser. No. 62/203,049, filed on Aug. 10, 2015, the contents of which are incorporated herein in its entirety.

FIELD OF THE INVENTION

The present disclosure generally relates to pipe machining apparatuses and, more particularly, to pipe machining apparatuses for machining large diameter pipes.

BACKGROUND

Pipe machining apparatuses, such as travelling pipe cutters, which carry a cutting tool around a cylindrical hollow vessel or pipe, are known in the art. Travelling pipe cutters may be suitable for cutting through a wall of a cylindrical vessel having various thicknesses.

SUMMARY

In one aspect, a travelling pipe cutter is adapted to perform at least one of cutting and beveling a hollow vessel while traveling around the hollow vessel using a cutting tool mounted on the travelling pipe cutter.

In another aspect, a travelling pipe cutter includes a force adjustment assembly which is used to change the vertical position of an outer carriage relative to an inner carriage to compensate for the travelling pipe cutter going inwardly and outwardly as the travelling pipe cutter travels around the exterior of the hollow vessel in order to maintain constant pressure caused by a lever tension interface.

In another aspect, the travelling pipe cutter provides a low profile.

In yet another aspect, the travelling pipe cutter includes a guard assembly for covering and uncovering the cutting tool during cutting.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
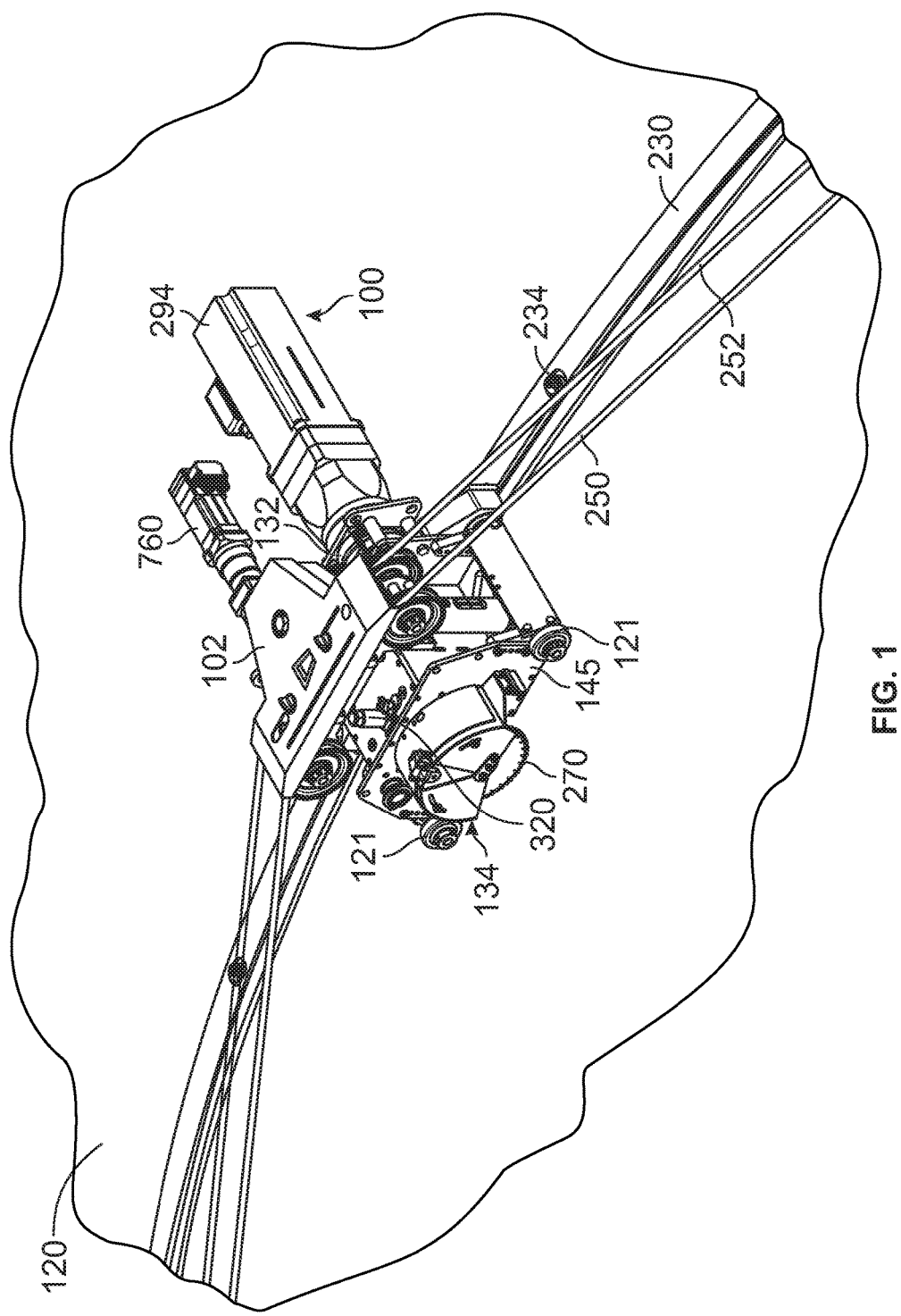
FIG. 1 depicts a perspective view of a travelling pipe cutter mounted on a guide track assembly.
Figure 2:
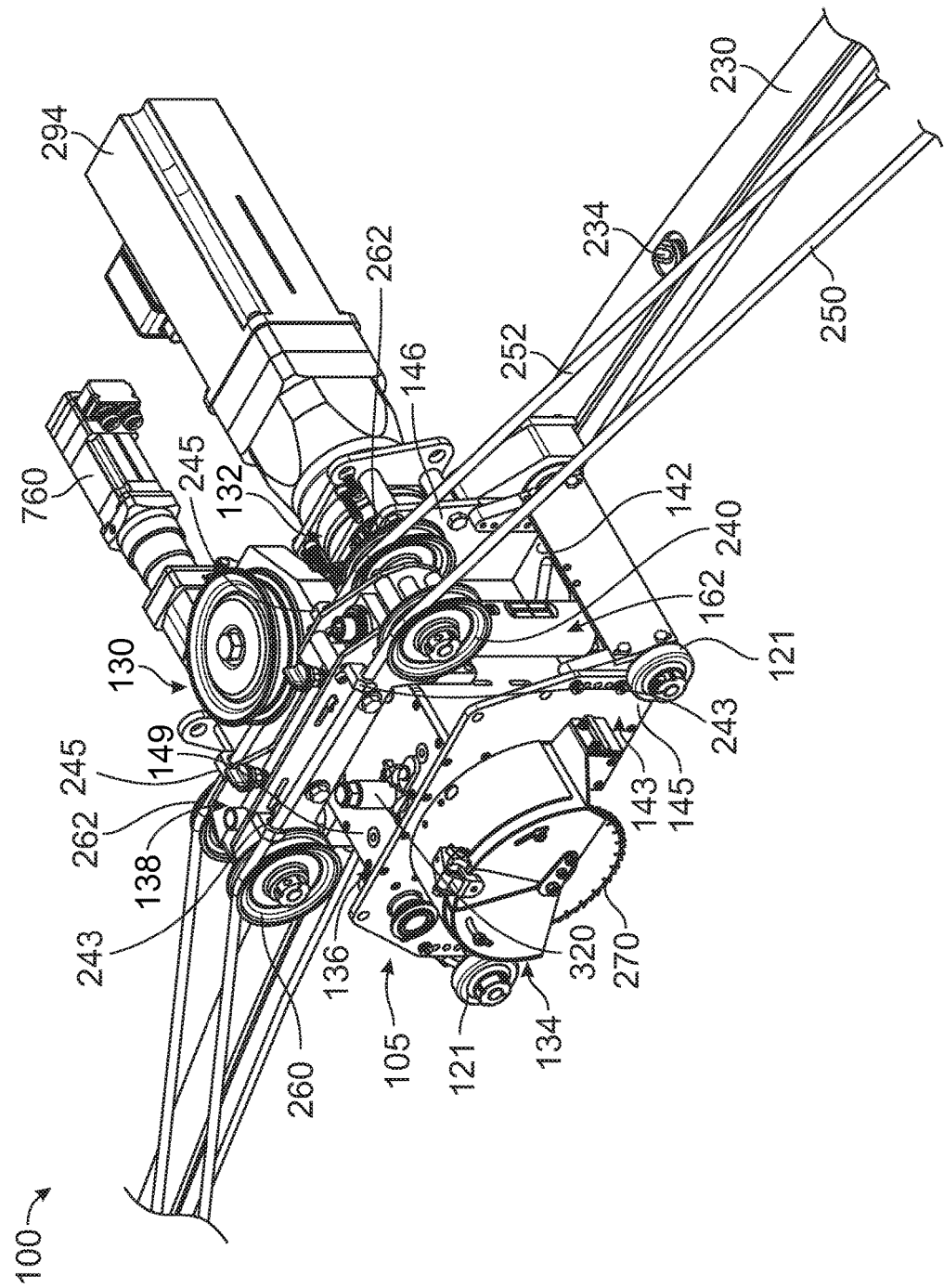
FIG. 2 depicts a perspective view of the travelling pipe cutter mounted on the guide track assembly with a cover of the travelling pipe cutter removed.

With reference to FIG. 1, an exemplary pipe machining apparatus such as, for example, a travelling pipe cutter 100, is shown. The travelling pipe cutter 100 includes a cutting tool 270 which may be used to cut through and/or form a bevel on a cylindrical hollow vessel 120, such as a large diameter pipe, as the travelling pipe cutter 100 travels around the circumference of the hollow vessel 120. FIG. 1 shows the travelling pipe cutter 100 with a top cover 102. FIG. 2 shows the travelling pipe cutter 100 with the top cover 102 removed.

For ease in description, the terms "inner" and "outer" as sometimes used herein are defined in a directional manner in relation to the hollow vessel 120 which the travelling pipe cutter 100 extends around.

The travelling pipe cutter 100 generally includes a frame 105, the cutting tool 270 which is mounted on a spindle 284 on the frame 105, a capstan assembly 130 mounted on the frame 105 for driving the travelling pipe cutter 100 around the hollow vessel 120, a gearbox assembly 132 mounted on the frame 105 for driving the spindle 284 of the cutting tool 270, and a guard assembly 134 mounted on the frame 105 and for covering the cutting tool 270 during cutting.

Figure 4:
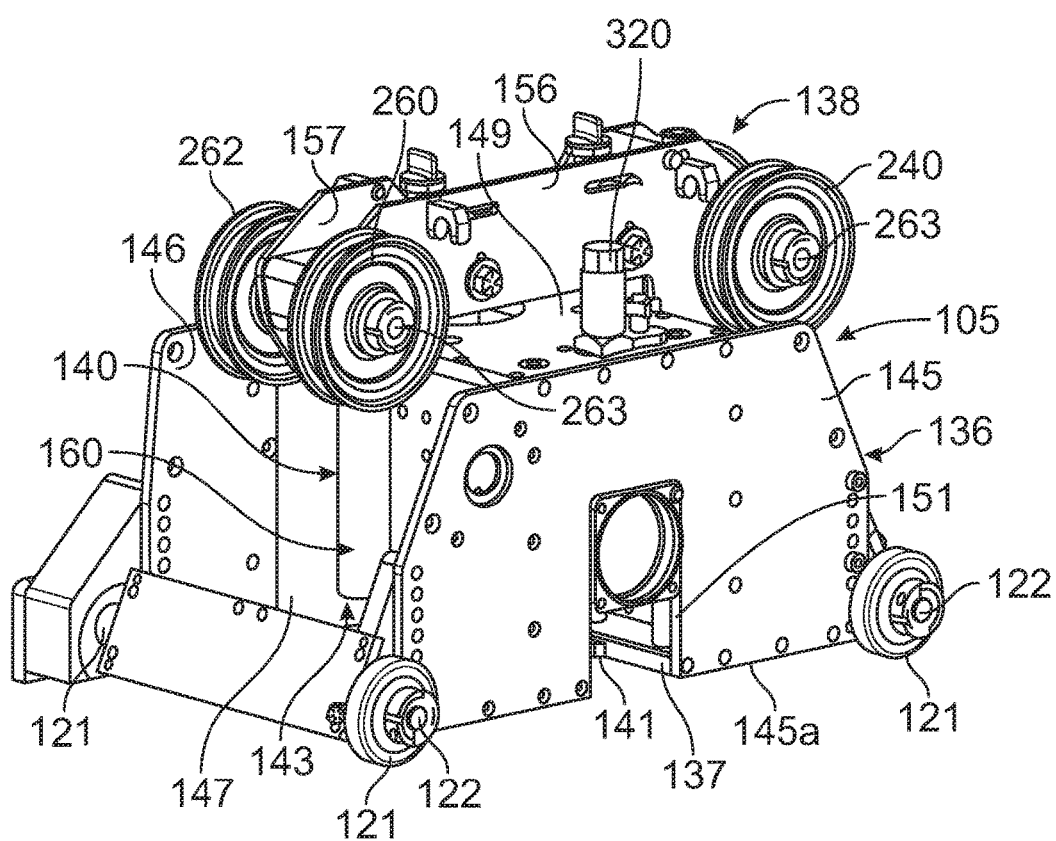
FIG. 4 depicts a perspective view of a frame of the travelling pipe cutter.
Figure 5:
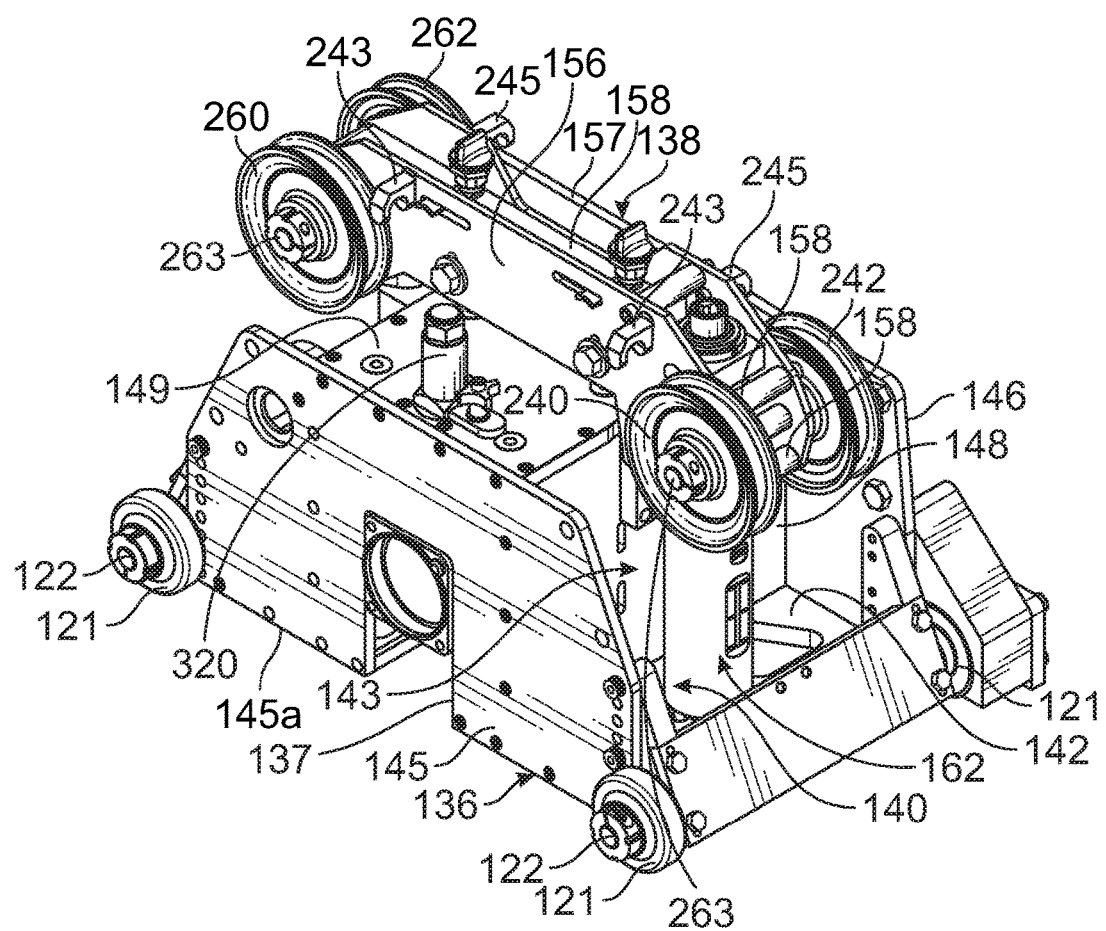
FIG. 5 depicts an alternate perspective view of a frame of the travelling pipe cutter.

As best shown in FIGS. 4 and 5, the frame 105 is formed of an inner carriage 136 and an outer carriage 138 which are joined together by a force adjustment assembly 140.

As shown in FIGS. 4 and 5, the inner carriage 136 is formed of a base plate 142 having a housing 143 extending upwardly therefrom. The housing 143 is formed of a forward wall 147, a rearward wall 148 and a pair of side walls 145, 146 extending therebetween, with forward and rearward being defined in the direction of travel of the travelling pipe cutter 100. The walls 145, 146, 147, 148 are attached to the base plate 142 and extending outwardly therefrom, and an outer plate 149 covering the outer ends of the walls 145, 146, 147, 148. Guide rollers 121 rotatably mounted on spindles 122 are attached to the inner carriage 136 to allow the travelling pipe cutter 100 to travel around the hollow vessel 120. The spindles 122 may be rotatably attached to the side walls 145, 146 or to the base plate 142.

Figure 6:
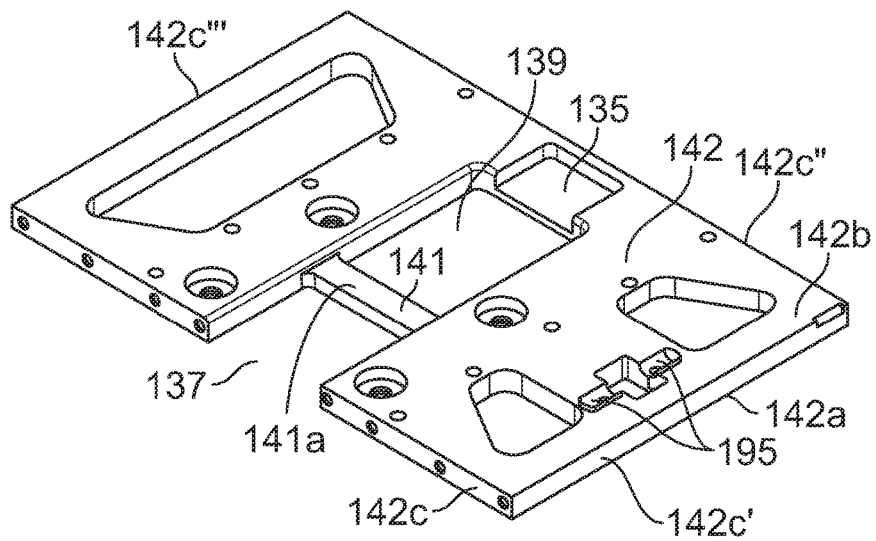
FIG. 6 depicts a perspective view of a base plate of the frame.
Figure 7:
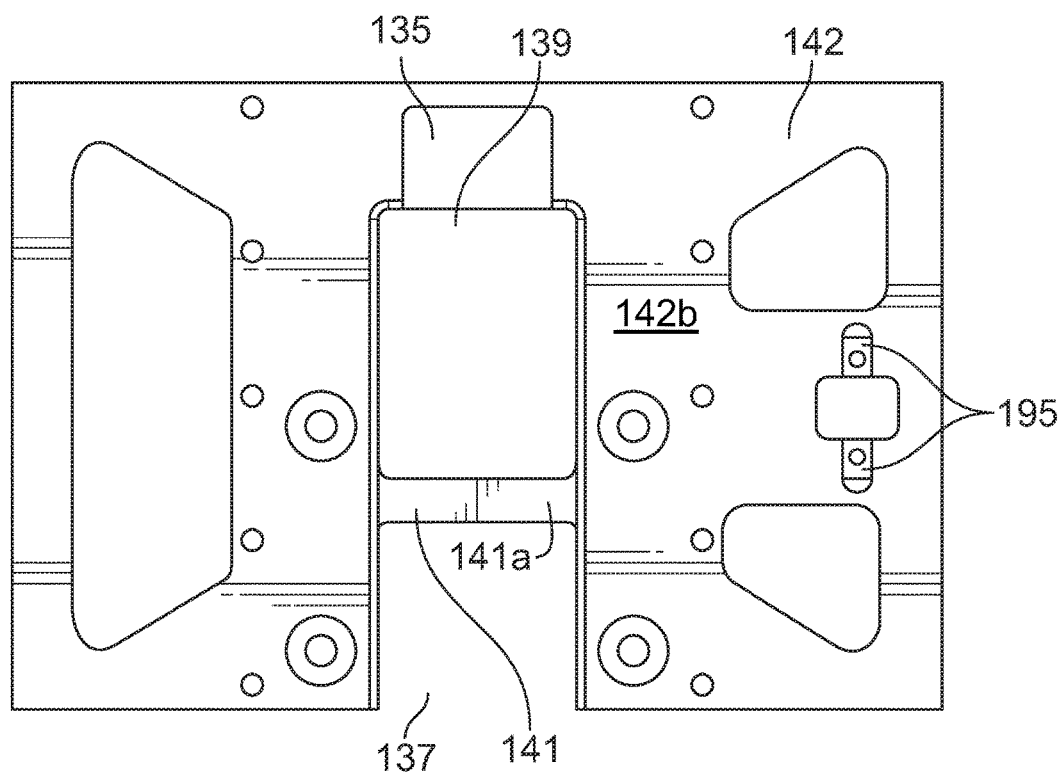
FIG. 7 depicts an elevational view of the base plate of FIG. 6.

As shown in FIGS. 6 and 7, the base plate 142 has an inner surface 142a, an opposite outer surface 142b and side edges 142c, 142c', 142c", 142c'". As shown, the base plate 142 is generally rectangular, but is to be understood that base plate 142 may take other forms. The base plate 142 has an aperture 137 extending into the base plate 142 from one side edge 142c' thereof, an aperture 139 extending through the base plate 142 and a recess 135 proximate to the aperture 139. The edge of the aperture 137 and the edge of the aperture 139 are separated from each other by a bridge portion 141 of the base plate 142. The bridge portion 141 has an outer surface 141a which is recessed inwardly from the outer surface 142b of the base plate 142.

Figure 3:
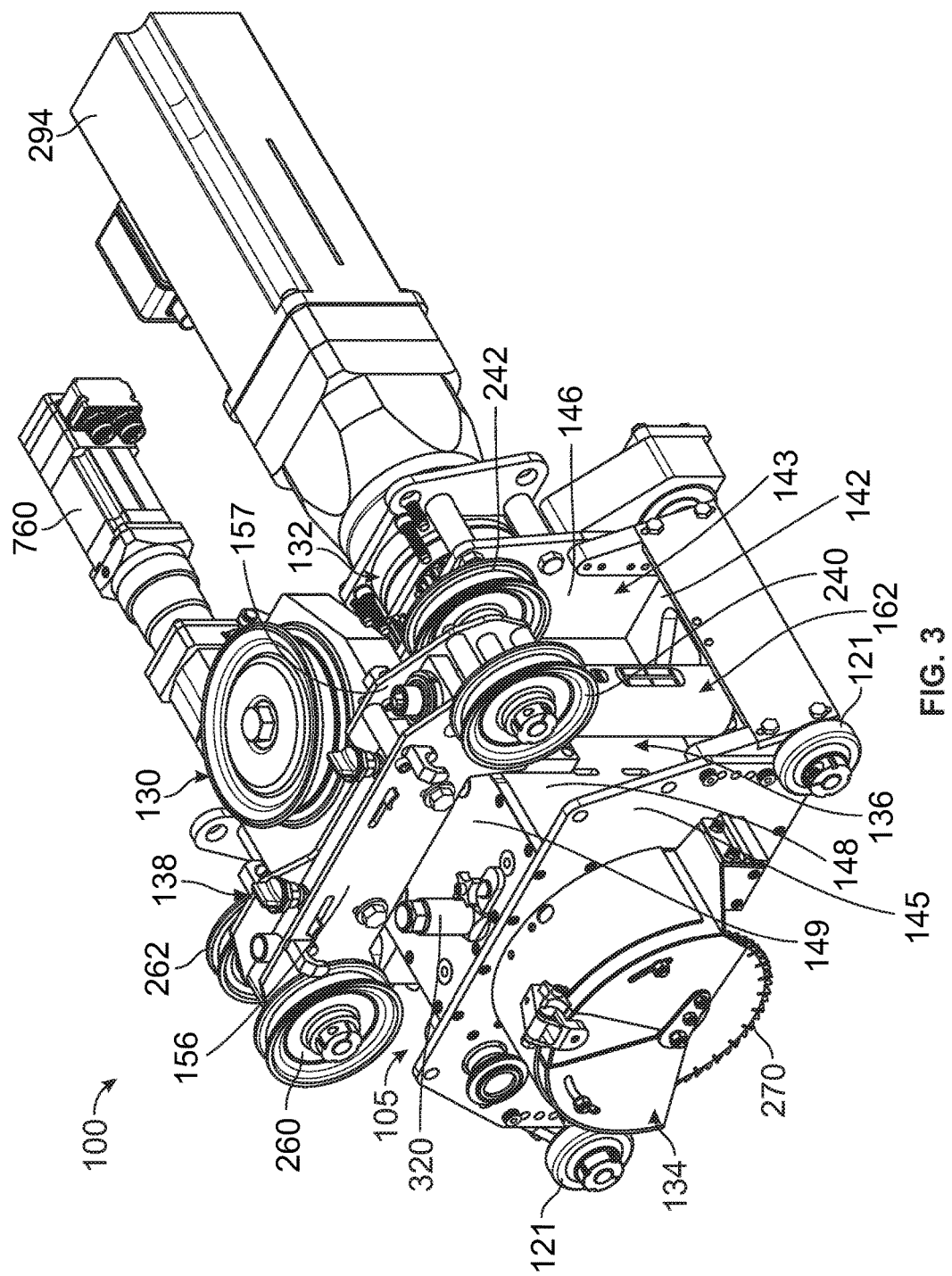
FIG. 3 depicts a perspective view of the travelling pipe cutter with the cover removed and the guide track assembly removed.
Figure 8:
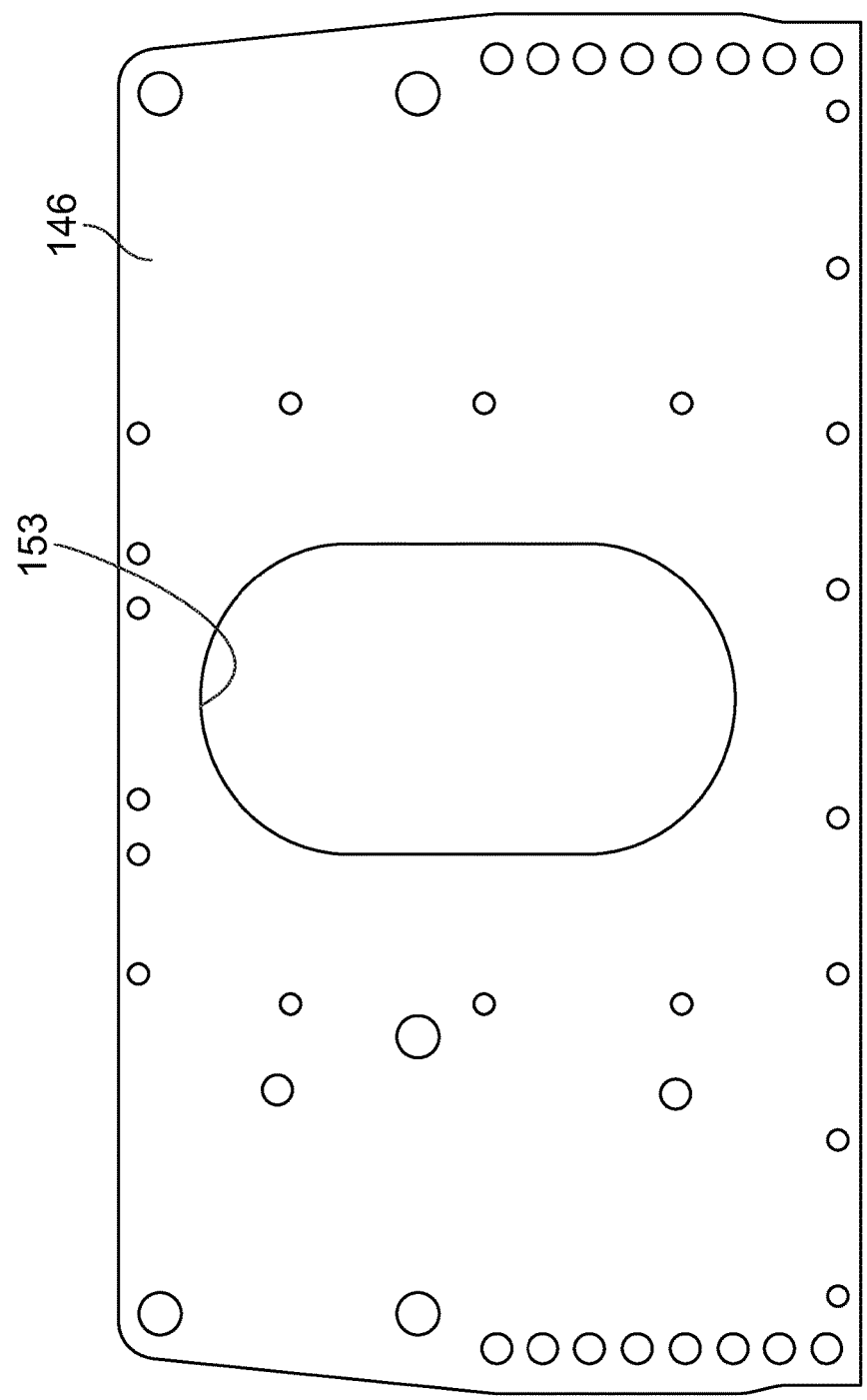
FIG. 8 depicts an elevational view of a wall of the frame.

As shown in FIGS. 3 and 8, the gearbox assembly 132 extends through an enlarged aperture 153 in the side wall 146, and the gearbox assembly 132 is attached to the outer plate 149 by an adjustment mechanism 320 described herein. As shown in FIGS. 4 and 5, the side wall 145 of the housing 143 of the inner carriage 136 has a cutout 151 extending outwardly from an inner edge 145a, see FIG. 4, through which the spindle 284 of the cutting tool 270 extends from the gearbox assembly 132. The vertical position of the gearbox assembly 132 and the cutting tool 270 can be adjusted vertically relative to the inner carriage 136 by the adjustment mechanism 320 as described herein.

The outer carriage 138 is formed of a pair of spaced apart plates 156, 157, see FIGS. 3-5, which are rigidly affixed to each other by the capstan assembly 130 and by the force adjustment assembly 140. Spacers 158, which may be a block and/or struts or tubes, may also be provided to rigidly affix the plates 156, 157 together. At each end of the plates 156, 157, a pair of grooved rollers 240, 242, 260, 262 are mounted on axles 263 that extends through the plates 156, 157. The grooved rollers 240, 242, 260, 262 are freely rotatable relative to the plates 156, 157. Grooved rollers 240, 260 form a groove for receiving a tension cable 250, see FIGS. 1 and 2, as discussed herein. Grooved rollers 242, 262 form a groove for receiving a feed cable 252, see FIGS. 1 and 2, as discussed herein. A plurality of guides 243 extend outwardly from the plate 156 and are used to hold the tension cable 250. A plurality of guides 245 extend outwardly from the plate 157 and are used to hold the feed cable 252.

Figure 9:
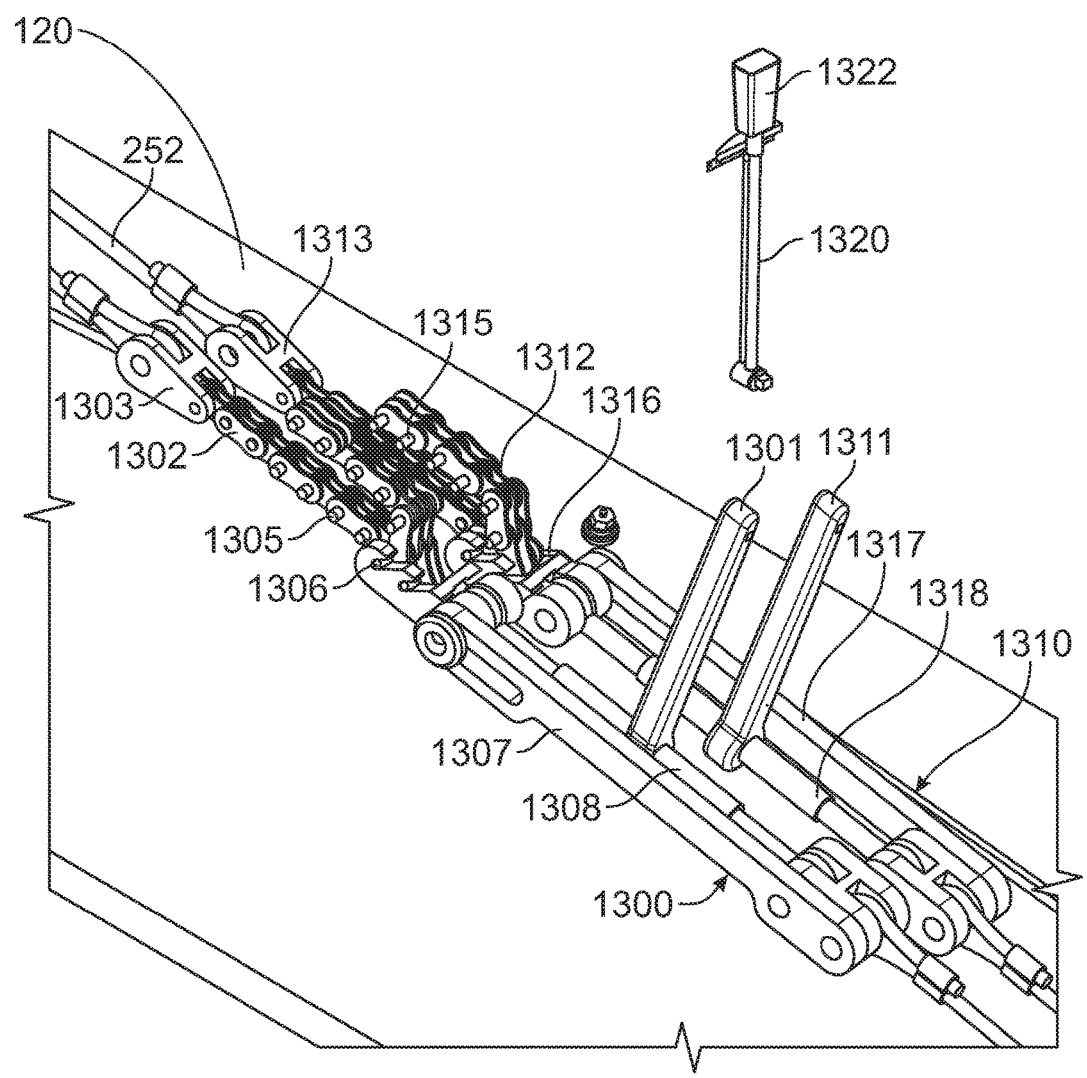
FIG. 9 depicts a perspective view of tension interface cable assemblies used with the travelling pipe cutter.

Referring to FIG. 9, each cable 250 and 252 extends around the hollow vessel 120 and connects at both ends to a respective tension interface cable assembly 1300 and 1310. Each tension interface cable assembly 1300, 1310 includes tension cable interface 1303, 1313 at one end connected with a respective cable 250, 252 and a respective chain 1302, 1312 with sprockets at an opposing end. At least some of the sprockets include projections 1305, 1315 which are inserted into one of a series of shafts 1306, 1316 formed on a lever tension interface 1307, 1317. Alternatively, other types of structures may be used, such as a link chain having links which are captured by members formed on the lever tension interface 1307, 1317. The chains 1302, 1312 and sprockets form an adjustable link coupling in that any one of a number of sprockets on the chain 1302, 1312 may be inserted into any one of a number of projections 1305, 1315 in order to adjust the eventual length of each cable 250, 252 so that the length of cable 250 is approximately equal to the length of cable 252. Equalizing the lengths of each cable 250, 252 helps reduce any imbalance between the cables 250, 252 before tensioning each cable 250, 252.

The tension on each cable 250, 252 can be adjusted through each lever tension interface 1307, 1317. Each lever tension interface 1307, 1317 includes a tensioning lever 1301, 1311 which, when moved in a ratcheting motion, increases or reduces the overall length of a corresponding member 1308, 1318 and, in effect, reduces or increases the amount of tension on each cable 250, 252. An overall length of each lever tension interface 1307, 1317 is adjustable using the tensioning lever 1301, 1311. As the tension on each cable 250, 252 increases, the amount of downward force $F_1$ and/or $F_2$ applied to the traveling pipe cutter 100 increases. In particular, the amount of downward force applied to the outer carriage 138 is increased to cause the outer carriage 138 to pivot relative to the inner carriage 136.

A torque wrench 1320, see FIG. 9, is used to ratchet the tensioning lever 1301, 1311 of the lever tension interfaces 1307, 1317. The torque wrench 1320 includes a display 1322 to allow the operator to know the tension being applied to the cables 250, 252.

The force adjustment assembly 140 is used to change the vertical position of the outer carriage 138 relative to the inner carriage 136 to compensate for the travelling pipe cutter 100 going inwardly and outwardly as the travelling pipe cutter 100 travels around the exterior of the hollow vessel 120 in order to maintain constant pressure caused by the lever tension interface 1307, 1317. As shown in FIG. 4, the force adjustment assembly 140 includes a guide wheel adjuster 160 attached to the forward wall 147 of the housing 143 of the inner carriage 136 and as shown in FIG. 5, a guide wheel spring 162 attached to the rearward wall 148 of the housing 143 of the inner carriage 136.

Figure 11:
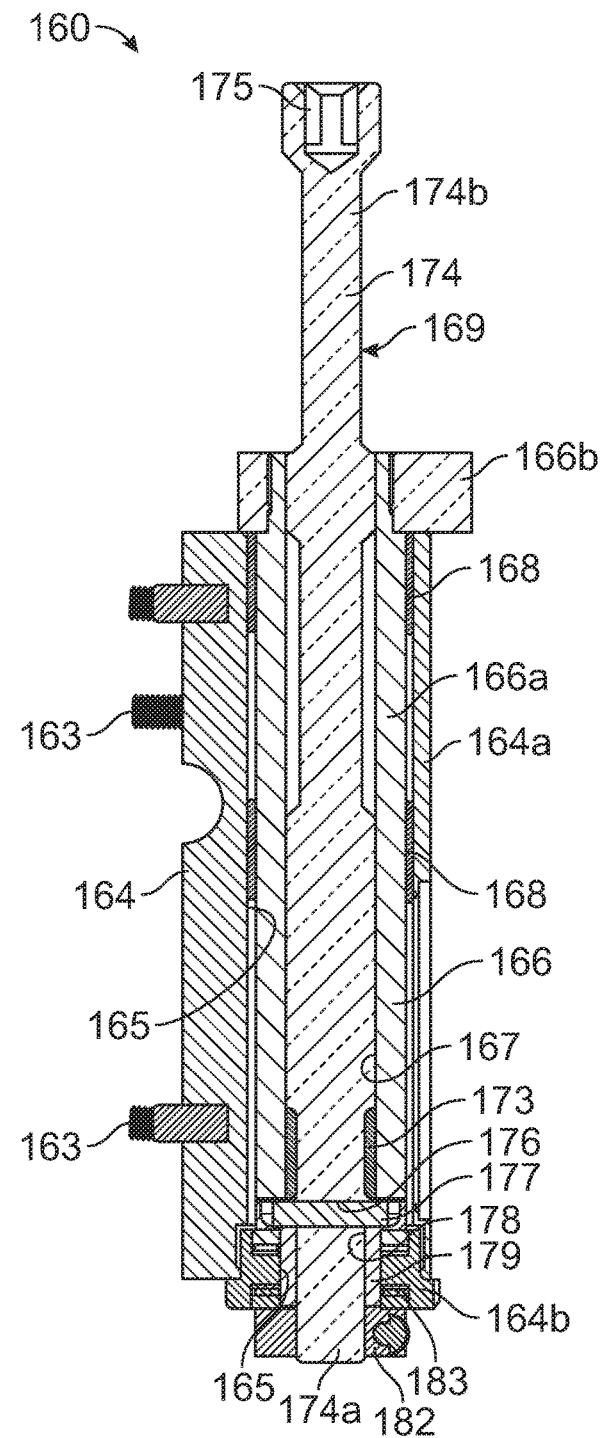
FIG. 11 depicts a cross-sectional view of the guide wheel adjuster of FIG. 10.

The guide wheel adjuster 160 is rigidly attached to the forward wall 147 of the housing 143 of the inner carriage 136 by suitable means, such as fasteners 163 (see FIG. 11), and extends upwardly therefrom. The guide wheel adjuster 160 extends between, and is pivotally attached to, the plates 156, 157 of the outer carriage 138.

Figure 10:
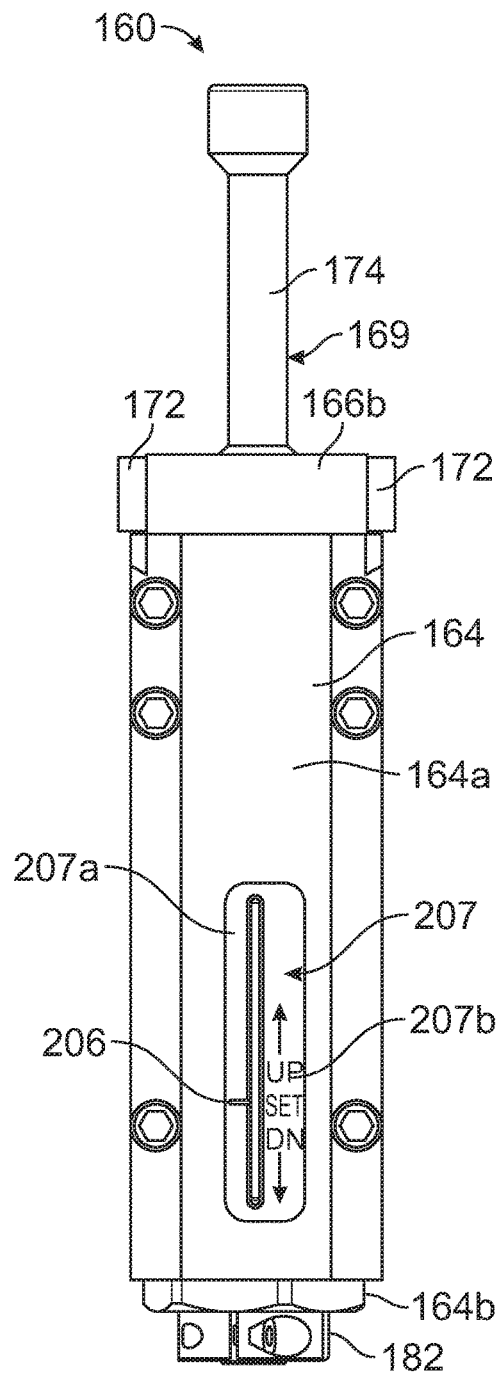
FIG. 10 depicts a side elevational view of a guide wheel adjuster which forms part of the travelling pipe cutter.

As best shown in FIG. 10, the guide wheel adjuster 160 includes a housing 164 having a first part 164a having a passageway 165 therethrough, and a second part 164b which partially closes an inner end of the passageway 165. A sleeve 166 seats within the passageway 165 of the housing 164. The sleeve 166 has a first part 166a having a passageway 167 therethrough, and a second part 166b which extends outwardly from an outer end 164c of the housing 164. The second part 166b includes a pair of pivot pins 172 extending therefrom. Bearings 168 surround the sleeve 166 and allow the sleeve 166 to slide relative to the housing 164.

A position adjustment assembly 169 extends through the passageway 167 in the sleeve 166. The position adjustment assembly 169 includes a shank 174, a pin 177, a support 179 and a nut 182 which are connected together. The shank 174 extends through the passageway 167 of the sleeve 166, and has an inner end portion 174a which extends inwardly from the sleeve 166 and an outer end portion 174b which extends outwardly from the sleeve 166. The shank 174 is threadedly connected to the sleeve 166 at threads 173. A tool engaging recess 175 is formed in the outer end portion 174b of the shank 174. The shank 174 has a passageway 176 therethrough in which the pin 177 is mounted such that the pin 177 is perpendicular to the axis of the shank 174. The pin 177 engages an inner end of the sleeve 166. The support 179 is attached to the inner end of the shank 174 has recesses into which the pin 177 seats. Bearings 183 are provided between the second part 164b of the housing 164 and the support 179 to allow the position adjustment assembly 169 to rotate relative to the housing 164 and to the sleeve 166. The nut 182 is threadedly attached to the inner end portion 174a of the shank 174 and abuts against the bearings 183 to prevent the linear translation of the position adjustment assembly 169 relative to the housing 164 and to the sleeve 166.

The housing 164 is fixedly attached to the housing 143 of the inner carriage 136 by fasteners 163. The pivot pins 172 extending from the sleeve 166 seat within apertures or recesses in the plates 156, 157 of the outer carriage 138 to allow the outer carriage 138 to pivot relative to the guide wheel adjuster 160.

A force indicator 207 is provided on the guide wheel adjuster 160 to allow the operator to adjust the vertical position of the outer carriage 138 relative to the inner carriage 136 when tension is being applied by the lever tension interface 1307, 1317 on the travelling pipe cutter 100. The force indicator 207 is formed from a window 207a having indicia 207b thereon. Indicia 206 is provided on the sleeve 166 and is visible in the window 207a. When the guide wheel adjuster 160 is adjusted, a tool (not shown) is engaged with the tool engaging recess 175 and the position adjustment assembly 169 is rotated. Since the shank 174 cannot linearly translate relative to the housing 164, the rotation of the position adjustment assembly 169 causes the linear translation of the sleeve 166 via the threaded connection at threads 173. Since the sleeve 166 is attached by pivot pins 172 to the plates 156, 157 of the outer carriage 138, this causes the inward or outward movement of the outer carriage 138 relative to the inner carriage 136.

The pivot pins 172 extending from the sleeve 166 seat within apertures or recesses in the plates 156, 157 of the outer carriage 138 to allow the outer carriage 138 to pivot relative to the guide wheel adjuster 160.

Figure 12:
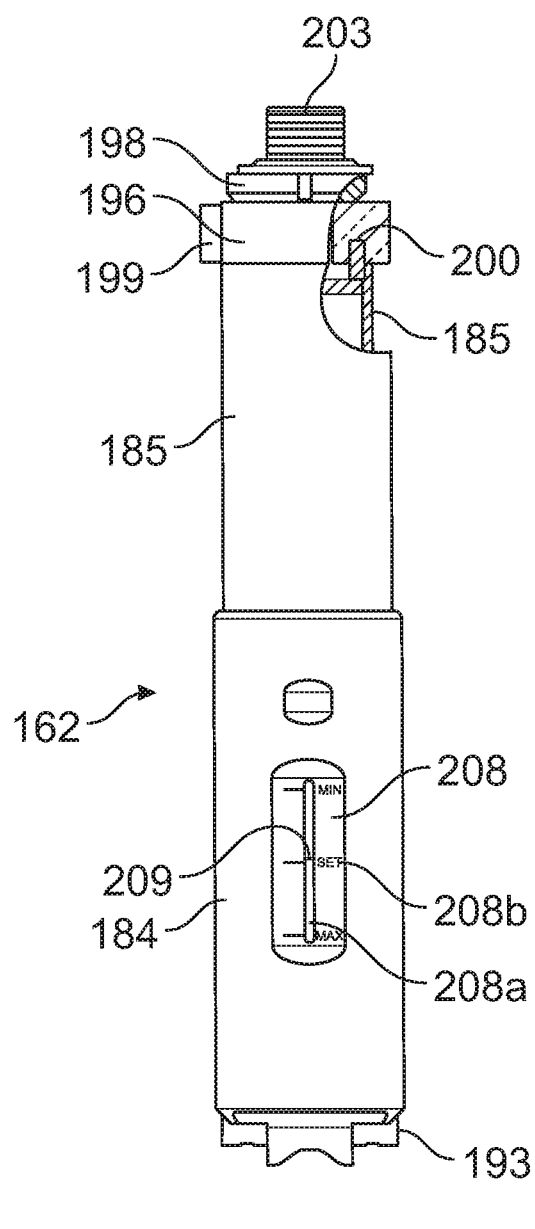
FIG. 12 depicts a side elevational view of a guide wheel spring which forms part of the travelling pipe cutter.
Figure 13:
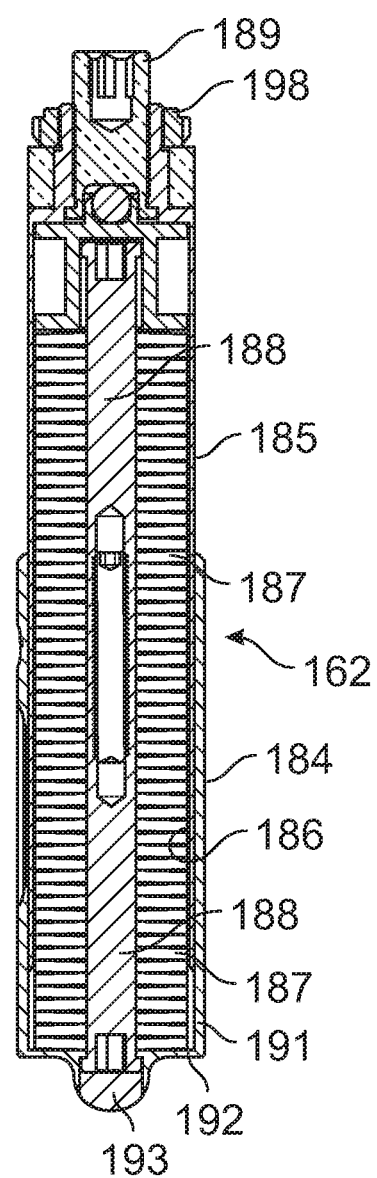
FIG. 13 depicts a cross-sectional view of the guide wheel spring of FIG. 12.
Figure 14:
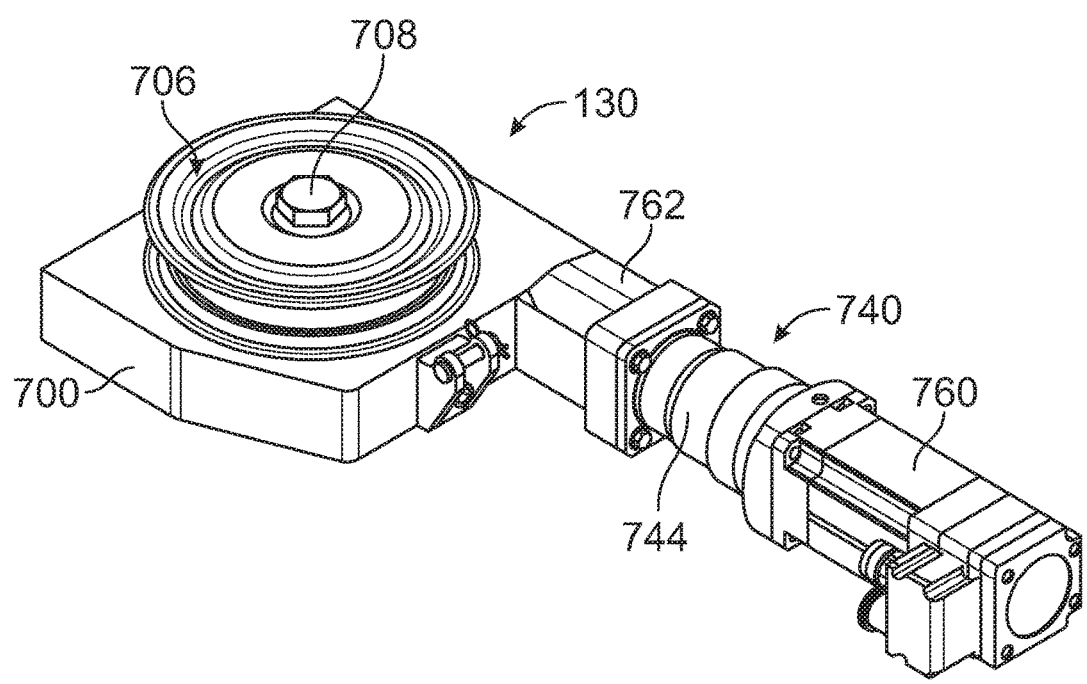
FIG. 14 depicts a perspective view of a capstan assembly which forms part of the travelling pipe cutter and which includes a capstan in accordance with a first embodiment.
Figure 15:
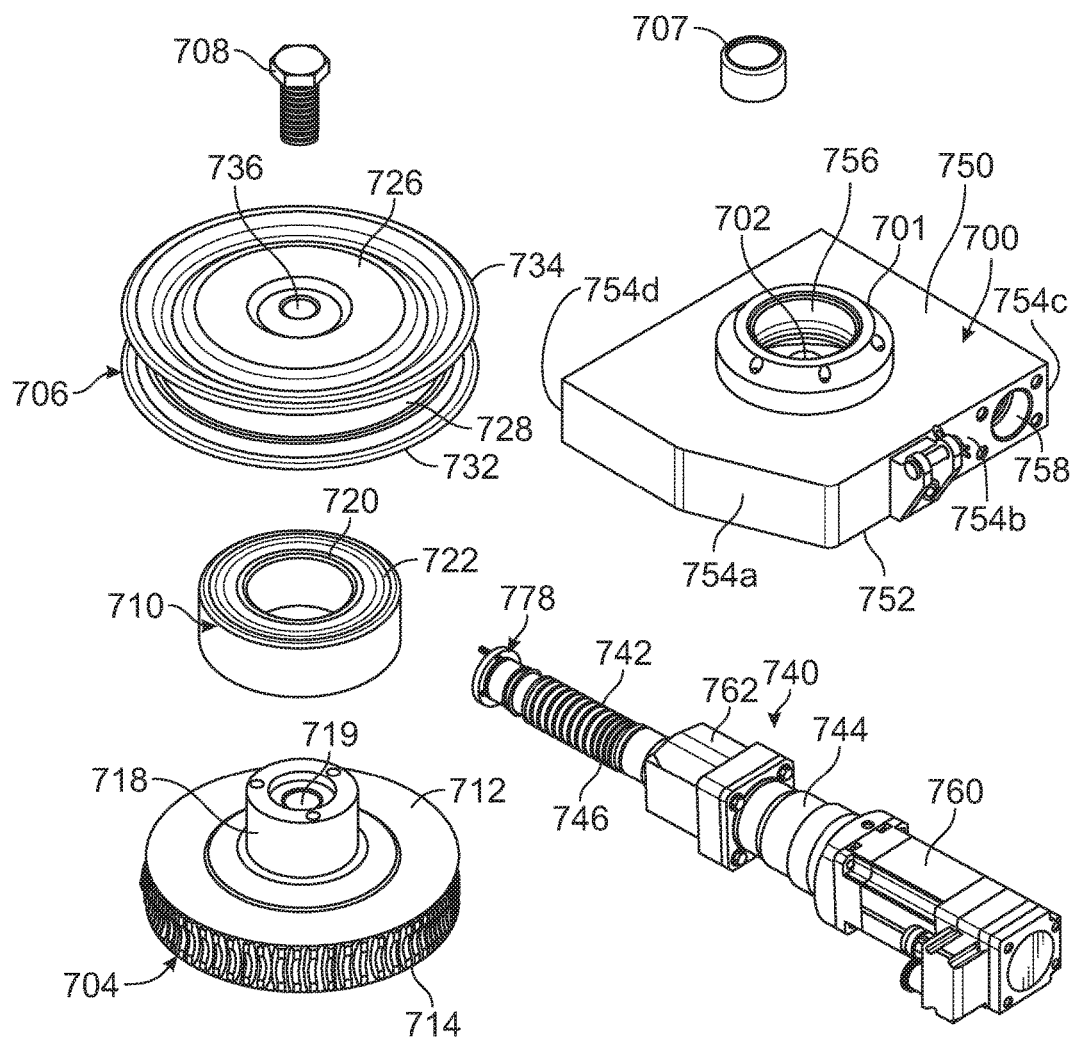
FIG. 15 depicts an exploded, perspective view of the capstan assembly with the capstan of FIG. 14.

As shown in FIG. 3, the guide wheel spring 162 is pivotally attached to the base plate 142 of the inner carriage 136 and is pivotally attached to the plates 156, 157 of the outer carriage 138. As best shown in FIGS. 12 and 13, the guide wheel spring 162 includes inner and outer housings 184, 185 forming a passageway 186 therethrough in which a plurality of springs 187, such as Belleville washers, are mounted on mated bars 188, and a closing assembly 189. The outer housing 185 is slidable relative to the inner housing 184 such that the outer housing 185 telescopes into and relative to the inner housing 184. The inner housing 184 is formed from a side wall 191 and an end wall 192. The opposite end of the inner housing 184 is open. The end wall 192 has a pair of pivot pins 193 extending therefrom which seat within recesses formed in the base plate 142 of the inner carriage 136. A mount 196 and a nut 198 seat on the outer end of the outer housing 185. The nut 198 is threadedly attached to the outer end of the outer housing 185 and secures the mount 196 on the shoulder 194 of the outer housing 185. A pair of pivot pins 199 extend radially outwardly from the mount 196. The mount 196 is rotationally affixed to the outer housing 185 by suitable means, such as pins 200. The closing assembly 189 seats in the outer end of the outer housing 185, bears against the springs 187 within the inner housing 184, and holds the springs 187 within the inner housing 184.

The pivot pins 193 on the inner housing 184 seat within recesses 195 in the base plate 142 of the inner carriage 136 to allow the inner carriage 136 to pivot relative to the guide wheel spring 162. The pivot pins 199 on the mount 196 seat within apertures in the plates 156, 157 of the outer carriage 138 to allow the outer carriage 138 to pivot relative to the guide wheel spring 162.

A force indicator 208 is provided on the guide wheel spring 162 to allow the operator to know how much tension is being applied by the lever tension interface 1307, 1317 on the travelling pipe cutter 100. The force indicator 208 is formed from a window 208a having indicia 208b thereon. Indicia 209 is provided on the outer housing 185 and is visible in the window 208a. When the tension is applied by the lever tension interface 1307, 1317, since the outer housing 185 is pivotally attached to the outer carriage 138 by pivot pins 199, the outer housing 185 moves relative to the inner housing 184 which causes the indicia 209 to move along the length of the window 208a and indicate to the operator the amount of tension.

The tension provided by the guide wheel spring 162 can be adjusted to a desired set force before operating the travelling pipe cutter 100. To do so, an operator engages the lever tension interface 1307, 1317 to an initial "SET" position force as indicated by the guide wheel adjuster 160. This causes the springs 187 of the guide wheel spring 162 to compress or expand depending upon the direction of rotation of the lever tension interface 1307, 1317. The movement of the inner and outer housings 184, 185 relative to each other, and thus the movement of the outer carriage 138 relative to the inner carriage 136, is then limited by the amount of spring force provided by springs 187.

With reference to FIG. 1, the travelling pipe cutter 100 is supported on the generally cylindrical hollow vessel 120 for movement about the circumference of the hollow vessel 120 by the guide rollers 121. It should be understood that the travelling pipe cutter 100 may be adapted to be coupled to hollow vessels of any shape and size such as, for exemplar, oval, square, rectangular, or any other polygonal or arcuately perimetered vessel. The guide rollers 121 are positioned on a guide track assembly 230. Positioning the outer guide rollers 121 on the guide track assembly 230 allows the travelling pipe cutter 100 to make a more accurate cut of the hollow vessel 120. It will be readily apparent that the guide track assembly 230 can come in either a single unitarily formed piece or a plurality of sections that may be interconnected and fitted around the hollow vessel 120 to form a continuous track. Whether the guide track assembly 230 is a single unitarily formed piece or a plurality of sections, the guide track assembly 230 may be fastened to the hollow vessel 120 using fasteners 234.

With reference to FIGS. 1 and 2, at least one tension cable 250 is wrapped around the hollow vessel 120 and over the frame 105. The cable 250 may be guided over the frame 105 via a path. In one embodiment, a path is formed for guiding the tension cable 250 using the plurality of grooved rollers 240, 260 and the plurality of guides 243. Tension cable 250 is inserted or threaded through the pair of guides 243, and the cable 250 is tensioned against at least one and preferably both grooved rollers 240, 260 in order to apply a downward force $F_1$ against the travelling pipe cutter 100 in order to press and hold the travelling pipe cutter 100 against the hollow vessel 120. In some exemplary embodiments, the downward force $F_1$ is greater than about 11,000 N. In other exemplary embodiments, the downward force $F_1$ is greater than about 21,000 N. In further exemplary embodiments, the downward force $F_1$ is greater than about 36,000 N. This force $F_1$ presses the travelling pipe cutter 100 against the hollow vessel 120 and helps the cutting tool 270 of the travelling pipe cutter 100 pierce through an outer surface and wall of the hollow vessel 120.

In the illustrated exemplary embodiment, the grooved rollers 242, 262 receive the feed cable 252. The feed cable 252 may be used to provide additional force $F_2$ down onto the frame 105, and/or the feed cable 252 may be used to drive the travelling pipe cutter 100 around the hollow vessel 120. Feed cable 252 is inserted or threaded through a pair of guides 245 and the grooved rollers 242, 262. The cable 252 is tensioned against at least one and preferably both grooved rollers 242, 262 in order to apply the further downward force $F_2$ against the travelling pipe cutter 100 in order to press and hold the travelling pipe cutter 100 against the hollow vessel 120. In some exemplary embodiments, the downward force $F_2$ is greater than about 11,000 N. In other exemplary embodiments, the downward force $F_2$ is greater than about 21,000 N. In further exemplary embodiments, the downward force $F_2$ is greater than about 36,000 N. This downward force $F_2$ presses the travelling pipe cutter 100 against the hollow vessel 120 and helps the cutting tool 270 of the travelling pipe cutter 100 pierce through an outer surface and wall of the hollow vessel 120. Grooved rollers 240, 242 rotate about a first axis and grooved rollers 260, 262 rotate about a second axis with both the first and second axes aligned in a direction generally parallel with the outer surface and a central longitudinal axis of the hollow vessel 120.

During the travel of the travelling pipe cutter 100 around the hollow vessel 120, if the travelling pipe cutter 100 encounters a bump or a dimple, the force adjustment assembly 140 is used to ensure the cut is accurate. When a bump is encountered, the outer housing 185 of the guide wheel spring 162 telescopes inwardly relative to the inner housing 184 and the outer carriage 138 moves inwardly relative to the inner carriage 136 as the cables 250, 252 press downwardly onto the outer carriage 138. When a dimple is encountered, the outer housing 185 of the guide wheel spring 162 telescopes outwardly relative to the inner housing 184 and the outer carriage 138 moves outwardly relative to the inner carriage 136. When the operator sees the bump or dimple, the operator will see a corresponding change in the force indicator 208 on the guide wheel spring 162; that is, the indicia 209 will move from the "SET" position toward one of the "MIN" or "MAX" positions as the outer housing 185 telescopes relative to the inner housing 184 when the outer carriage 138 moves relative to the inner carriage 136. To ensure a proper cut, the operator then adjusts the guide wheel adjuster 160 to correct this change back to the "SET" position on the force indicator 207. To adjust the guide wheel adjuster 160, a tool is engaged with the tool engaging recess 175 and the position adjustment assembly 169 is rotated. Since the shank 174 cannot linearly translate relative to the housing 164, the rotation of the position adjustment assembly 169 causes the linear translation of the sleeve 166 via the threaded connection at threads 173. Since the sleeve 166 is attached by pivot pins 172 to the plates 156, 157 of the outer carriage 138, this causes the inward or outward movement of the outer carriage 138 relative to the inner carriage 136. After the bump or dimple is passed, the indicia 209 will again move from the "SET" position toward one of the "MIN" or "MAX" positions as the outer housing 185 telescopes relative to the inner housing 184 when the outer carriage 138 moves relative to the inner carriage 136. The operator again readjusts the guide wheel adjuster 160 back to the "SET" position on the force indicator 207 by again engaging a tool with the tool engaging recess 175 of guide wheel adjuster 160 and rotating the position adjustment assembly 169. Again, since the shank 174 cannot linearly translate relative to the housing 164, the rotation of the position adjustment assembly 169 causes the linear translation of the sleeve 166 via the threaded connection at threads 173. Since the sleeve 166 is attached by pivot pins 172 to the plates 156, 157 of the outer carriage 138, this causes the inward or outward movement of the outer carriage 138 relative to the inner carriage 136.

With reference to FIG. 2, in an embodiment, the feed cable 252 is engaged with the capstan assembly 130 which is more clearly shown in FIGS. 14-18. The capstan assembly 130 includes a housing 700 which is rigidly attached to the plate 157 of the outer carriage 138, a shaft 702 extending outwardly from the housing 700, a worm gear 704 seated within the housing 700 and affixed to the shaft 702 for rotation with the shaft 702, a bearing 707 mounted between the shaft 702 and the housing 700, a capstan 706, 1706 seated on an outer end of the worm gear 704, a fastener 708 threadedly attaching the capstan 706, 1706 to the worm gear 704, and a bearing 710 mounted between the worm gear 704 and the housing 700.

The housing 700 has an outer wall 750, an inner wall 752, and a plurality of side walls 754a, 754b, 754c, 754d connecting the outer and inner walls together 750, 752. A recess 756 is provided within the housing 700 into which the worm gear 704 seats. A collar 701 is attached to the outer wall 750 of the housing 700 and the recess 756 extends therethrough. A passageway 758 is provided through one of the side walls 754b and is in communication with the recess 756.

The worm gear 704 has a lower circular body 712 with a plurality of teeth 714 on its perimeter. The inner surface 716 of the body 712 is concave to form a concave recess 721. A central passageway 715 extends through the body 712. A shaft 718 extends outwardly from the body 712. The shaft 718 has a threaded central passageway 719 therethrough which is in communication with the passageway 715. The body 712 seats within the recess 756 in the housing 700 and the shaft 702 seats within the passageway 715. An inner portion of the recess 756 conforms in shape to the body 712. The shaft 718 extends through an outer portion of the recess 756 which is through the collar 701.

Figure 16:
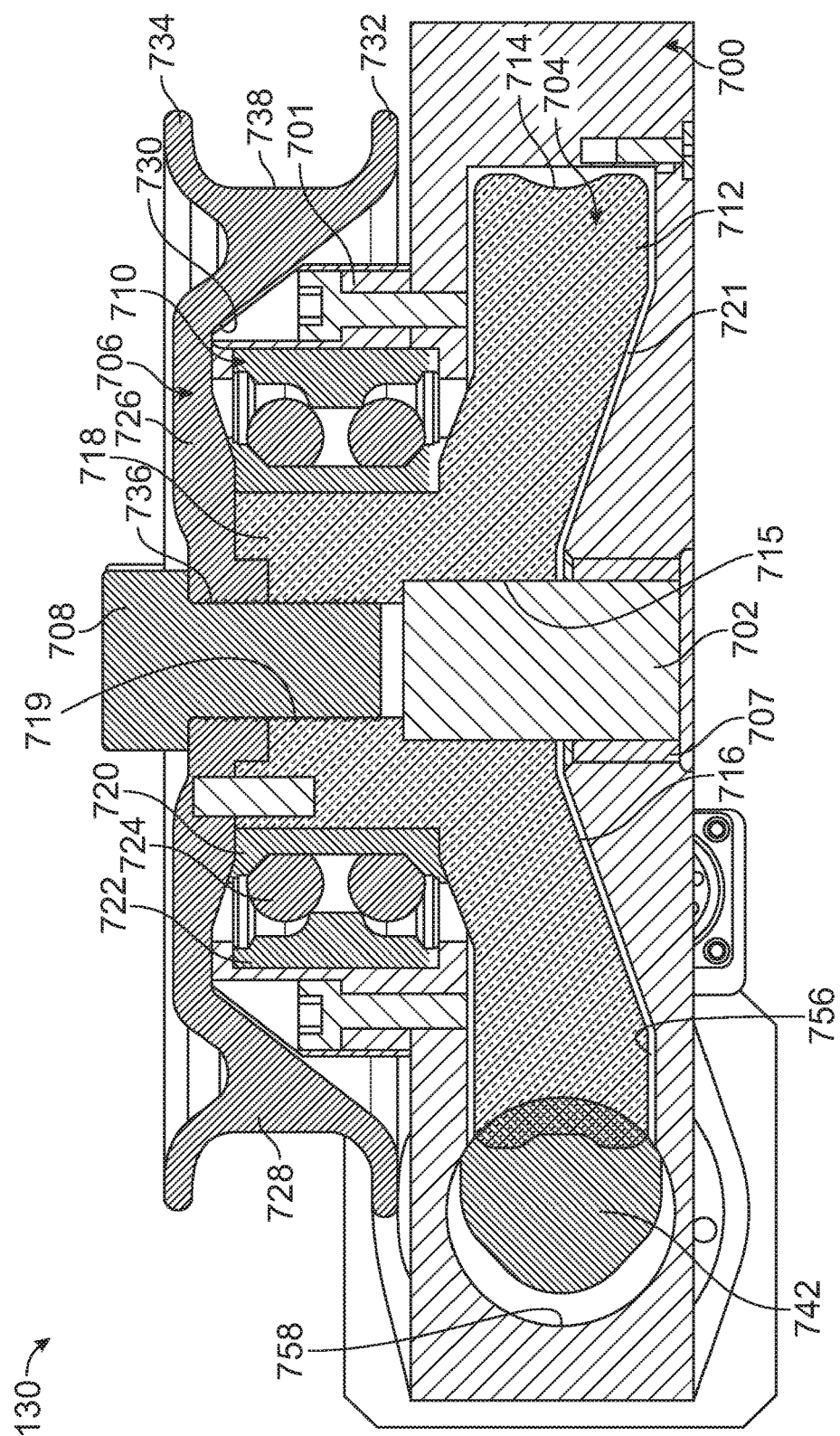
FIG. 16 depicts a cross-sectional view of the capstan assembly with the capstan of FIG. 14.

The bearing 710 has an inner race 720 and an outer race 722 with a plurality of ball bearings 724 therebetween. As shown in FIG. 16, the bearing 710 is a duplex angular contact bearing. The bearing 710 seats around the shaft 718 of the worm gear 704 and within an outer portion of the recess 756 through the collar 701. The inner race 720 engages with the shaft 718 of the worm gear 704 such that the bearing 710 seats on the body 712 of the worm gear 704 and rotates with the worm gear 704. The outer race 722 is attached to the collar 701. The bearing 710 extends outwardly from the collar 701. The bearing 710 enables rotation of the worm gear 704 relative to the housing 700.

Figure 17:
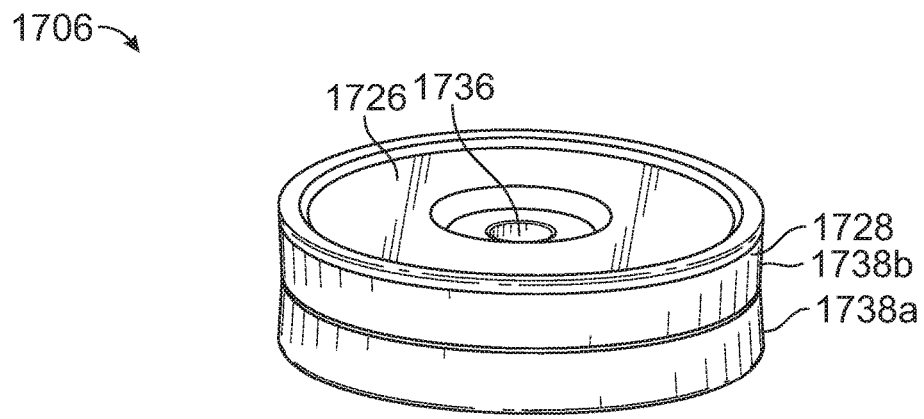
FIG. 17 depicts a perspective view of a capstan for use in the capstan assembly in accordance with a second embodiment.
Figure 18:
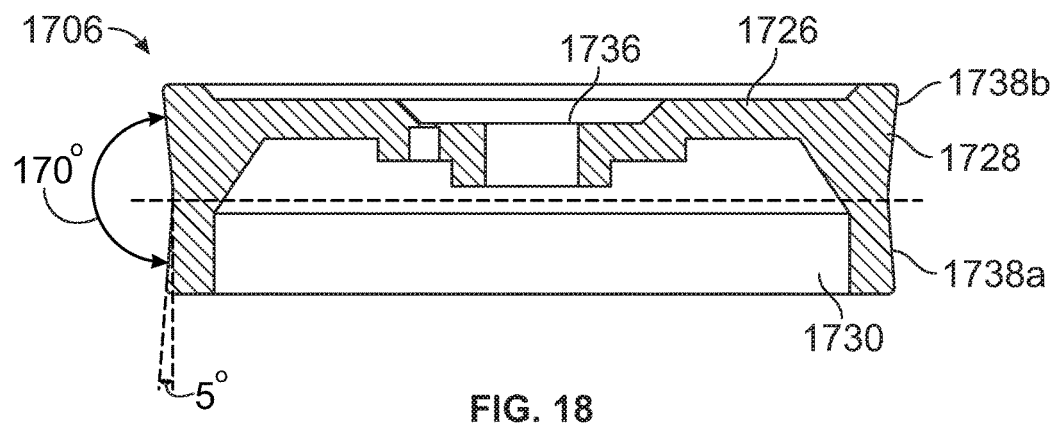
FIG. 18 depicts a cross-sectional view of the capstan of FIG. 17.
Figure 19:
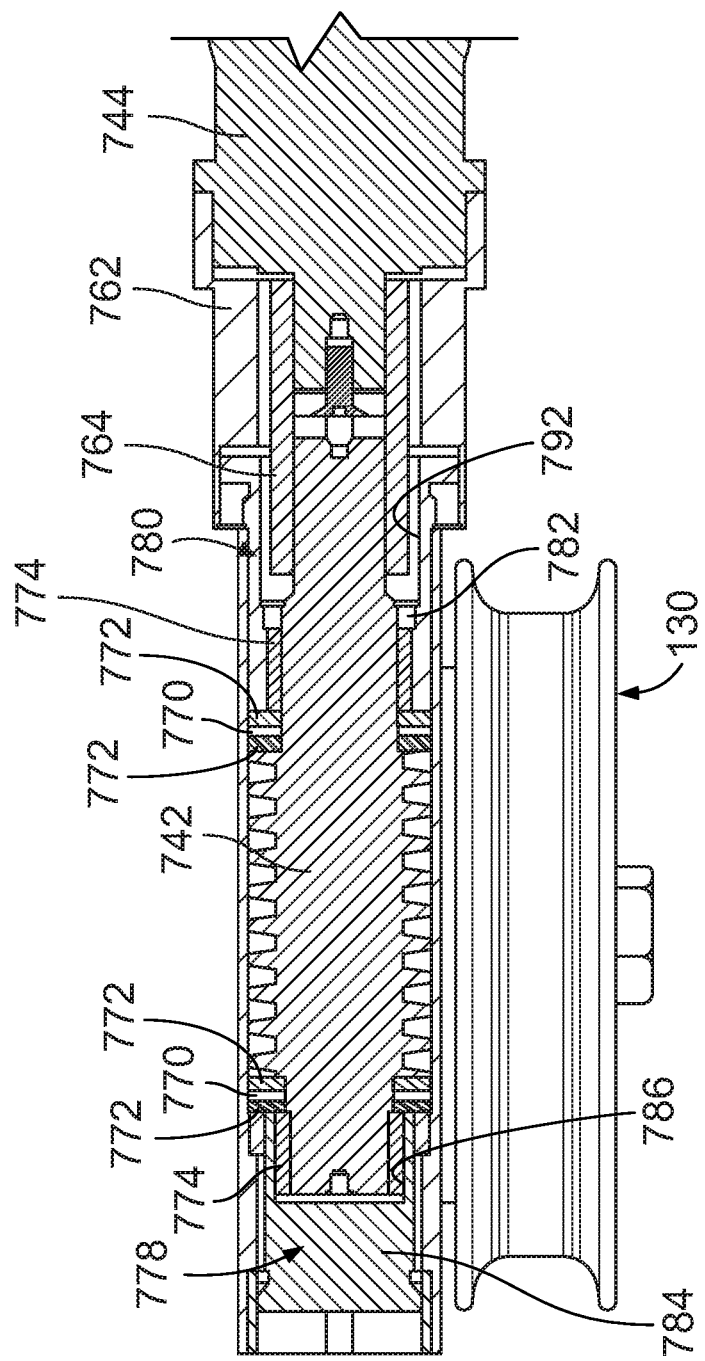
FIG. 19 depicts a cross-sectional view of the capstan of FIG. 14 and a portion of a drive mechanism.
Figure 20:
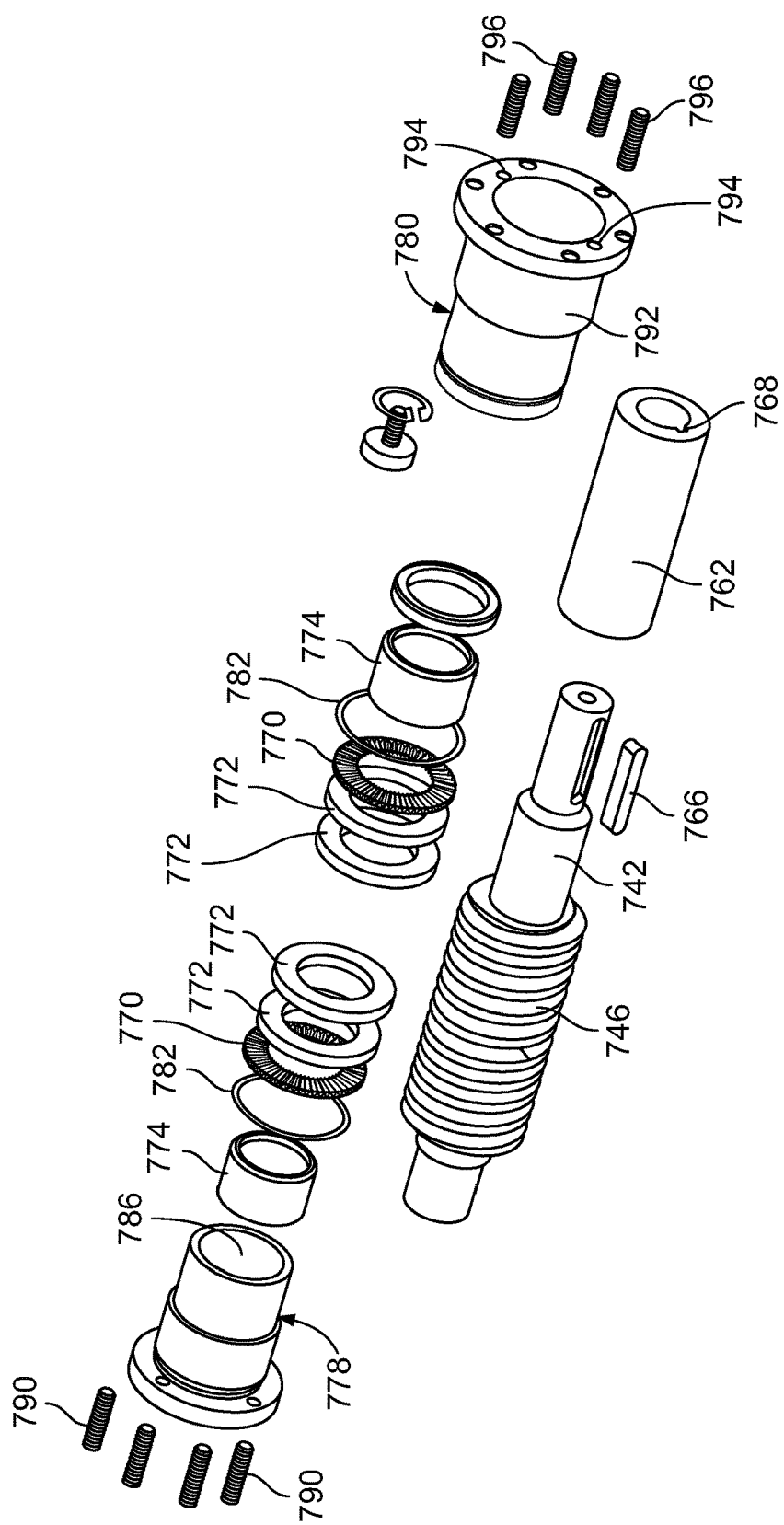
FIG. 20 depicts an exploded perspective view of the portion of the drive mechanism of FIG. 19.
Figure 21:
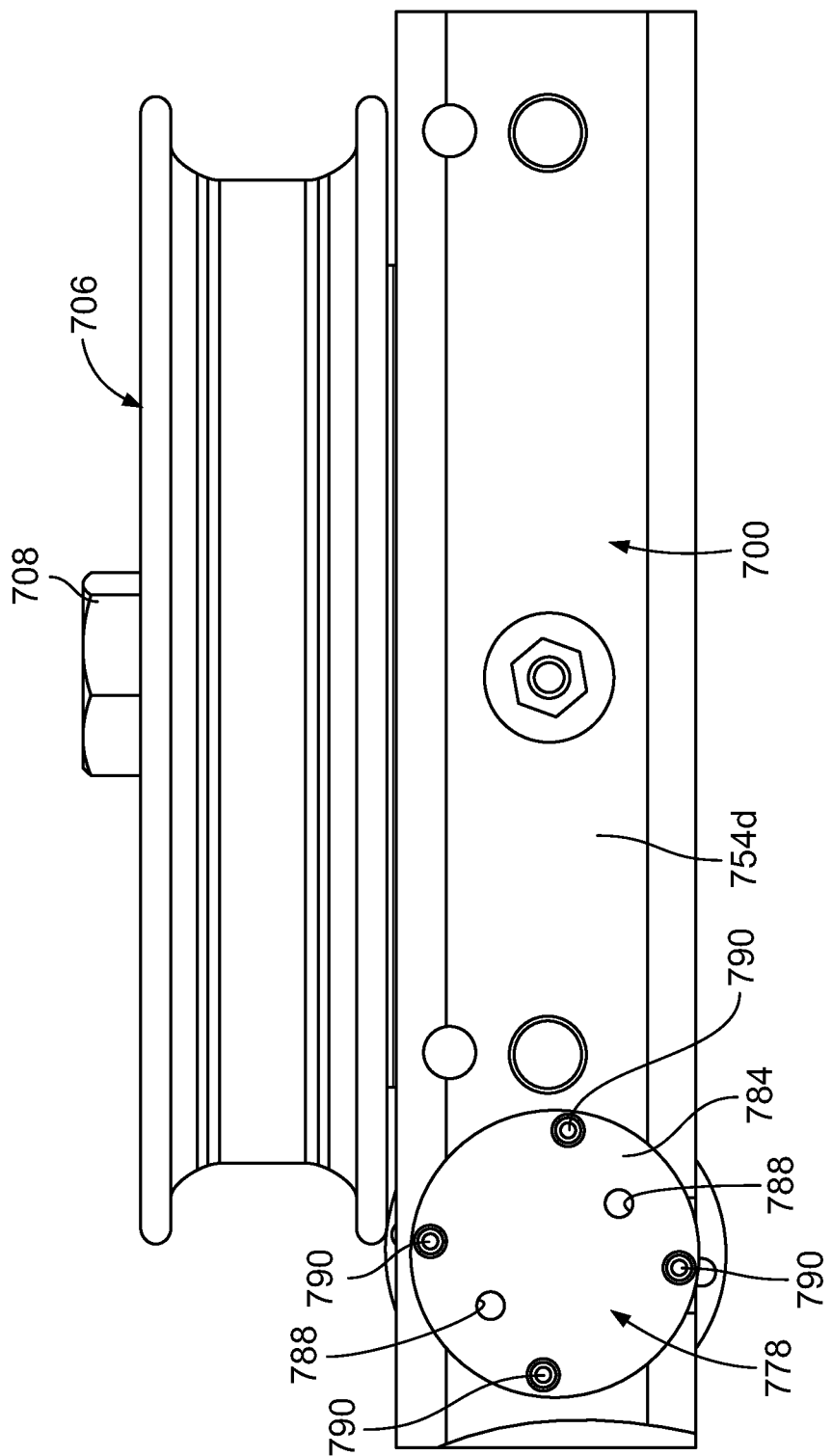
FIGS. 21 and 22 depict end elevation views of the capstan of FIG. 14 and a portion of the drive mechanism.
Figure 22:
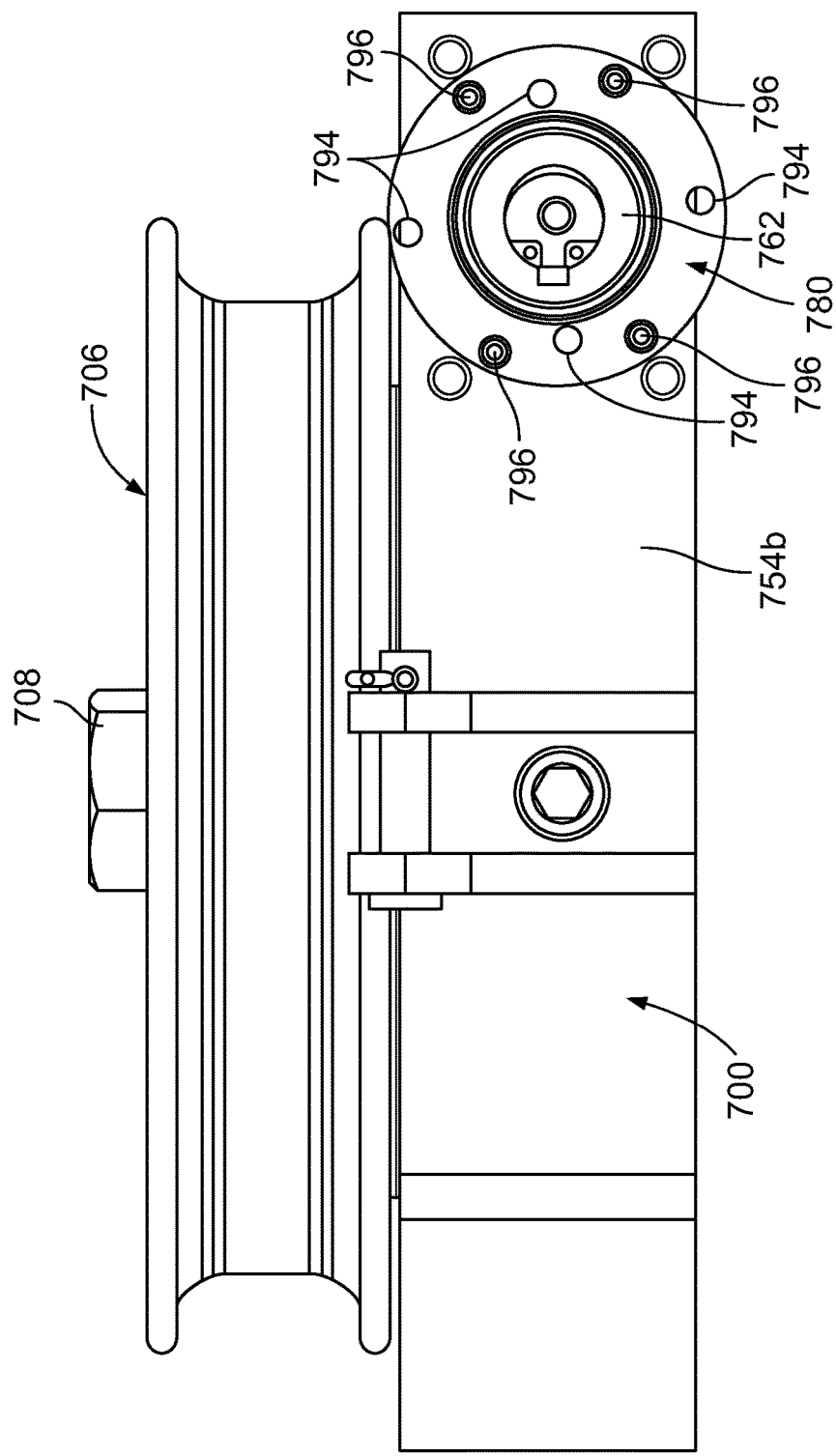

A first embodiment of the capstan 706 is shown in FIGS. 14-16 and 19. A second embodiment of the capstan 1706 is shown in FIGS. 17 and 18.

The first embodiment of the capstan 706 has a circular base wall 726 from which a skirt 728 depends. The skirt 728 depends from the base wall 726 and defines a generally concave recess 730 in the underside of the capstan 706. A passageway 736 extends through the base wall 726 and is in communication with the recess 730. The outer surface of the skirt 728 forms a cylindrical wall 738. A pair of spaced apart circular flanges 732, 734 extend radially outwardly from the skirt 728 at its inner and outer edges.

The second embodiment of the capstan 1706 has a circular base wall 1726 from which a skirt 1728 depends. The skirt 1728 depends from the base wall 1726 and defines a generally concave recess 1730 in the underside of the capstan 1706. A passageway 1736 extends through the base wall 1726 and is in communication with the recess 1730. The outer surface of the skirt 1728 is formed from a pair of angled walls 1738a, 1738b which form a V-shape. As shown, the V-shape forms an included angle of 170 degrees; that is, each wall 1738a, 1738b is angled relative to the centerline of the capstan 1706 by 5 degrees.

The fastener 708 is threadedly attached through the passageway 736, 1736 through the base wall 726, 1726 of the capstan 706, 1706 and threadedly engages with the threaded passageway 719 in the shaft 718 to rotationally fix the capstan 706, 1706 and the shaft 718 together. The bearing 710, a portion of the shaft 718 of the worm gear 704 and the collar 701 of the housing 700 seat within the capstan recess 730, 1730. This arrangement allows for a lower profile of the capstan assembly 130 and, thus, a reduced height dimension of the travelling pipe cutter 100.

The capstan assembly 130 is driven by a drive mechanism 740. The drive mechanism 740 includes a motor 760 connected to, and driving, a dual lead worm gear shaft 742 via a gearbox 744. A gearbox adapter 762 connects the gearbox 744 to the housing 700. The gearbox 744 is attached to the dual lead worm gear shaft 742 by a coupler 764. The coupler 764 is keyed to the gearbox 744 and to the dual lead worm gear shaft 742 to rotationally fix the dual lead worm gear shaft 742 to the gearbox 744. A key 766 extends outwardly from the dual lead worm gear shaft 742 and seats within a keyway 768 in the coupler 764. The keyway 768 is longer than the key 766 to allow the dual lead worm gear shaft 742 to slide relative to the coupler 764 and relative to the gearbox 744, while rotationally fixing the dual lead worm gear shaft 742 to the gearbox 744. The dual lead worm gear shaft 742 can slide relative to the gearbox 744.

The dual lead worm gear shaft 742 is formed of two leads, which forms a thread form 746 on the dual lead worm gear shaft 742 which increases in thickness from one end of the dual lead worm gear shaft 742 to the other end of the dual lead worm gear shaft 742.

The dual lead worm gear shaft 742 is mounted between a worm gear adjuster 778 and a worm gear tensioner 780 that are threadedly connected to the walls 750, 752, 754c forming the passageway 758. A plurality of bearings 770 and washers 772 are sandwiched between the dual lead worm gear shaft 742 and the housing 700 to allow the dual lead worm gear shaft 742 to rotate relative to the housing 700. A bearing 774 is sandwiched between the dual lead worm gear shaft 742 and the worm gear adjuster 778 to allow the dual lead worm gear shaft 742 to rotate relative to the worm gear adjuster 778. A bearing 774 is sandwiched between the dual lead worm gear shaft 742 and the worm gear tensioner 780 to allow the dual lead worm gear shaft 742 to rotate relative to the worm gear tensioner 780. The bearings 774 may be needle bearings. A seal 782 is provided between worm gear adjuster 778 and the dual lead worm gear shaft 742. A seal 782 is provided between worm gear tensioner 780 and the dual lead worm gear shaft 742.

The worm gear adjuster 778 is formed from a cup-shaped body 784 which has a recess 786 in one end in which the bearing 774 and an end of the dual lead worm gear shaft 742 are seated, and a plurality of spaced apart openings 788 in the opposite end. The body 784 is threadedly connected to the housing 700. The body 784 may also be attached to the housing 700 by fasteners 790.

The worm gear tensioner 780 is formed from a cup-shaped body 792 which has a passageway 794 therethrough in which the bearing 774 and the opposite end of the dual lead worm gear shaft 742 are seated, and a plurality of spaced apart openings 794 in the opposite end. The body 792 is threadedly connected to the housing 700. The body 792 may also be attached to the housing 700 by fasteners 796.

The axial position of the dual lead worm gear shaft 742 can be altered relative to the teeth 714 on the worm gear 704 to reduce the backlash between the dual lead worm gear shaft 742 and the worm gear 704 to virtually zero. In order to change the axial position of the dual lead worm gear shaft 742 relative to the teeth 714 on the worm gear 704, the fasteners 790, 796 are removed or backed off such that they do not engage housing 700 and a tool (not shown), such as a spanner wrench, is engaged with the openings 788 to rotate the worm gear adjuster 778 relative to the housing 700, and a tool (not shown), such as a spanner wrench, is engaged with the apertures 794 to rotate the worm gear tensioner 780 relative to the housing 700. The dual lead worm gear shaft 742 is rotated relative to the housing 700 and which causes the dual lead worm gear shaft 742 to axially translate relative to the housing 700 until the backlash is reduced to the desired level. Thereafter, the worm gear adjuster 778 and the worm gear tensioner 780 are moved toward the dual lead worm gear shaft 742 to securely hold the bearings and washers 770, 772, 774 in place.

The thread form 746 on the dual lead worm gear shaft 742 is interengaged with the teeth 714 on the worm gear 704. As such, rotation of the dual lead worm gear shaft 742 causes rotation of the capstan 706, 1706 via the worm gear 704 and the fastener 708. The motor 760 may be, for example, an electric motor, an electric servo motor, a fluid motor, an electric servo motor, a hydraulic motor, an air drive motor, etc. In some exemplary embodiments, the motor 760 may be a hydraulic motor with the hydraulic motor connected into a hydraulic circuit and suitable valving utilized to control the flow of oil to the motor 760.

During use, the feed cable 252 seats on the wall 738, 1738a, 1738b of the skirt 728, 1728. In the first embodiment of the capstan 706, the flanges 732, 734 prevent the feed cable 252 from disengaging with the capstan 706. In the second embodiment of the capstan 1706, the V-shaped walls 1738a, 1738b prevent the feed cable 252 from disengaging with the capstan 1706. The drive mechanism 740 rotates the capstan 706, 1706 in either a clockwise direction or a counterclockwise direction as desired. With the feed cable 252 wrapped around the capstan 706, 1706 under tension, the capstan 706, 1706 may be used to drive the travelling pipe cutter 100 along the track 232 and around the hollow vessel 120 by simply rotating the capstan 706, 1706 using the drive mechanism 740.

In some exemplary embodiments, the tension cable 250 and the feed cable 252 may each wrap around the same capstan or respective different capstans and either or both cables 250, 252 may be used to drive the travelling pipe cutter 100 along the track 232 and around the hollow vessel 120. Additionally, either or both cables 250 and 252 may be tensioned to provide a downward force $F_1$ or $F_2$ onto the frame 105. Furthermore, while only one tension cable 250 and one feed cable 252 are shown, multiple tension cables 250 and multiple feed cables 252 may be used to provide additional downward force or drive capabilities for the travelling pipe cutter 100.

As discussed, each cable 250 and 252 extends around the hollow vessel 120 and connects at both ends to a respective lever tension interface 1307, 1317. The tension on each cable 250, 252 can be adjusted through each lever tension interface 1307, 1317. As the tension on each cable 250, 252 increases, the amount of downward force $F_1$ and/or $F_2$ applied to the travelling pipe cutter 100 increases. Additionally, the downward force $F_1$, $F_2$ can be adjusted by using the guide wheel adjuster 160 on the travelling pipe cutter 100 as discussed herein.

In the travel of the travelling pipe cutter 100 about the hollow vessel 120, a cut 225 is made through a wall of the hollow vessel 120 by the cutting tool 270. In some exemplary embodiments, the cutting tool 270 may be a metal-cutting slitting saw and/or a bevel type form cutter.

Figure 23:
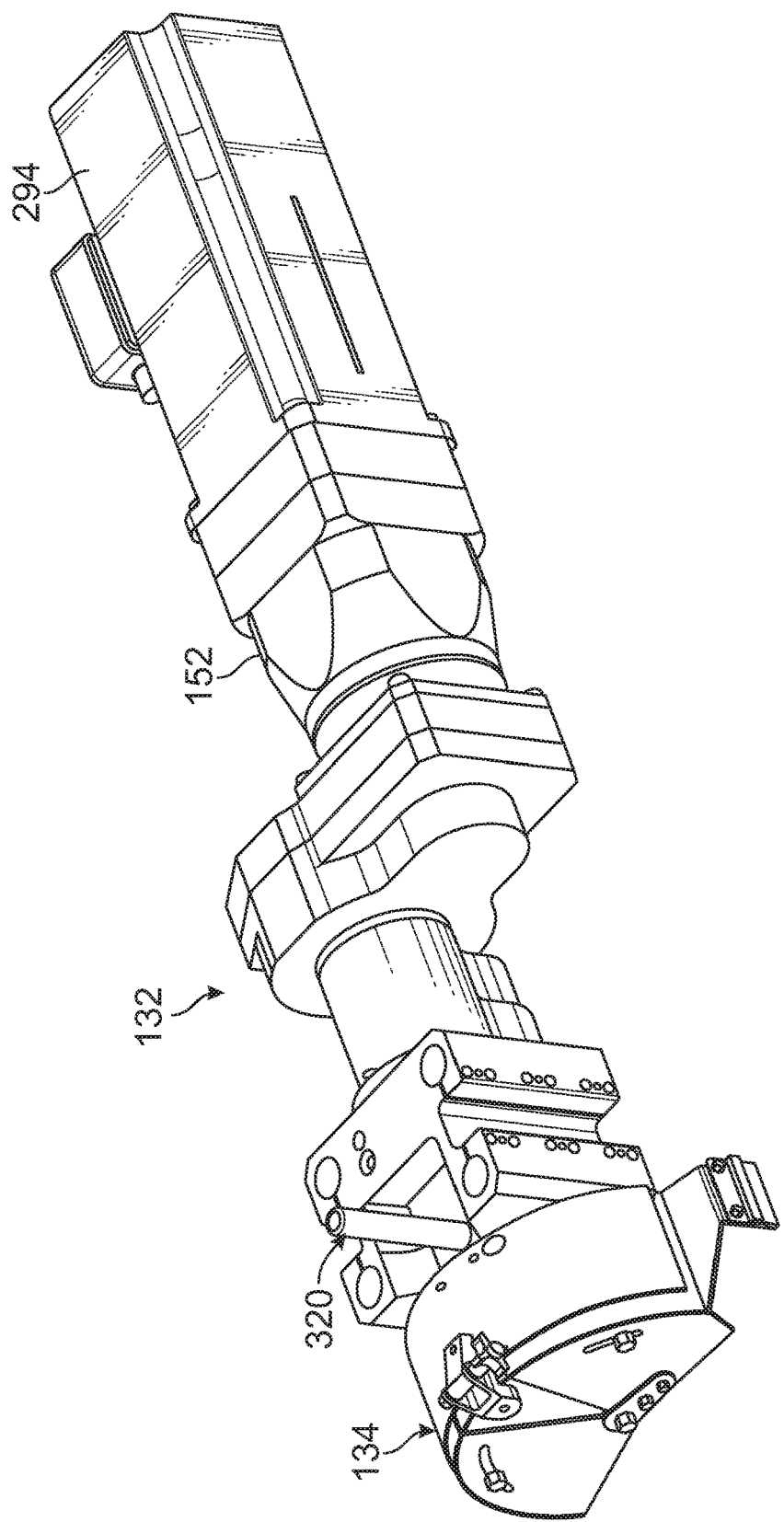
FIG. 23 depicts a perspective view of a gearbox assembly which forms part of the travelling pipe cutter.

As shown in FIG. 23, the drive for rotation of the cutting tool 270 is derived from a motor 294 which is mounted to a change gear box 152 connected to the gearbox assembly 132. Motor 294 may be any type of motor such as, for example, fluid motor, electric motor, electric servo motors, hydraulic motor, air drive motor, etc. In some exemplary embodiments, the motor 294 may be a hydraulic motor with the hydraulic motor connected into a hydraulic circuit and suitable valving utilized to control the flow of oil to the motor 294.

As best shown in FIGS. 23-26, the gearbox assembly 132 includes a housing 800 in which a drive shaft 802 is mounted. The drive shaft 802 extends through the side wall 146 of the inner carriage 136 and into the housing 800. The drive shaft 802 is connected to, and driven by, the change gear box 152 and the motor 294. A right-hand helical gear 804 and a left-hand helical gear 806 are mounted on the drive shaft 802 within the housing 800. Ends of the helical gears 804, 806 abut against each other. A plurality of needle roller bearings 808 surround the drive shaft 802 and engage with the housing 800 to allow the drive shaft 802 to rotate relative to the housing 800.

The cutting tool spindle 284 extends through the opposite side wall 145 of the inner carriage 136 and into the housing 800. A right-hand helical gear 810 and a left-hand helical gear 812 are mounted on the spindle 284 within the housing 800. Ends of the helical gears 810, 812 abut against each other. The axis of rotation of the spindle 284 is parallel to, but offset from the axis of rotation of the drive shaft 802. The right-hand helical gear 810 on the spindle 284 interengages with the right-hand helical gear 804 on the drive shaft 802; the left-hand helical gear 812 on the spindle 284 interengages with the left-hand helical gear 806 on the drive shaft 802. A plurality of needle roller bearings 814 surround the spindle 284 and engage with the housing 800 to allow the spindle 284 to rotate relative to the housing 800. A plurality of roller bearings 816 are provided between the spindle 284 and the housing 800 to further enable the rotation. The roller bearings 816 are positioned between the needle roller bearings 814.

Figure 25:
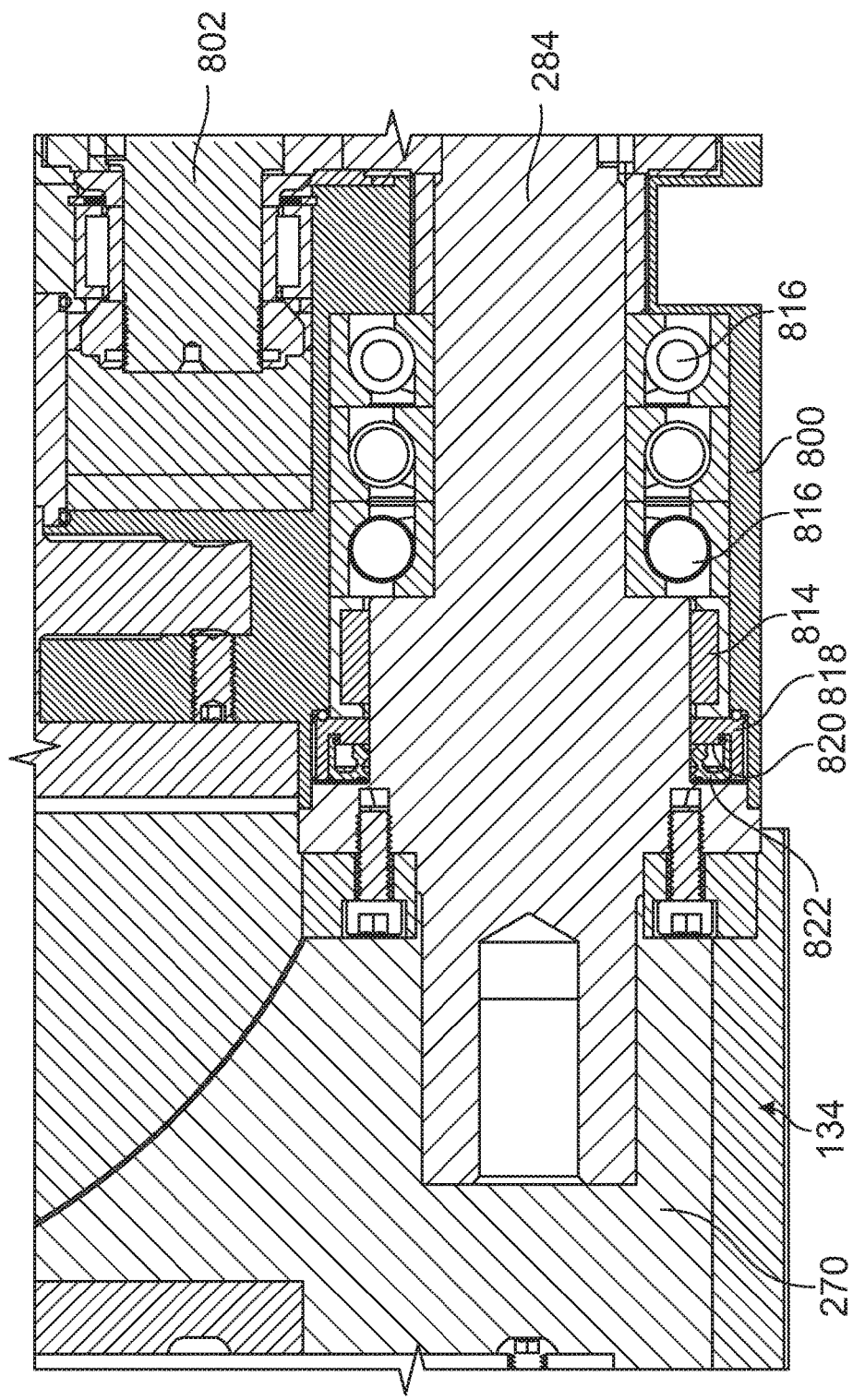
FIG. 25 depicts a partial cross-sectional view of the gearbox assembly of FIG. 23.
Figure 26:
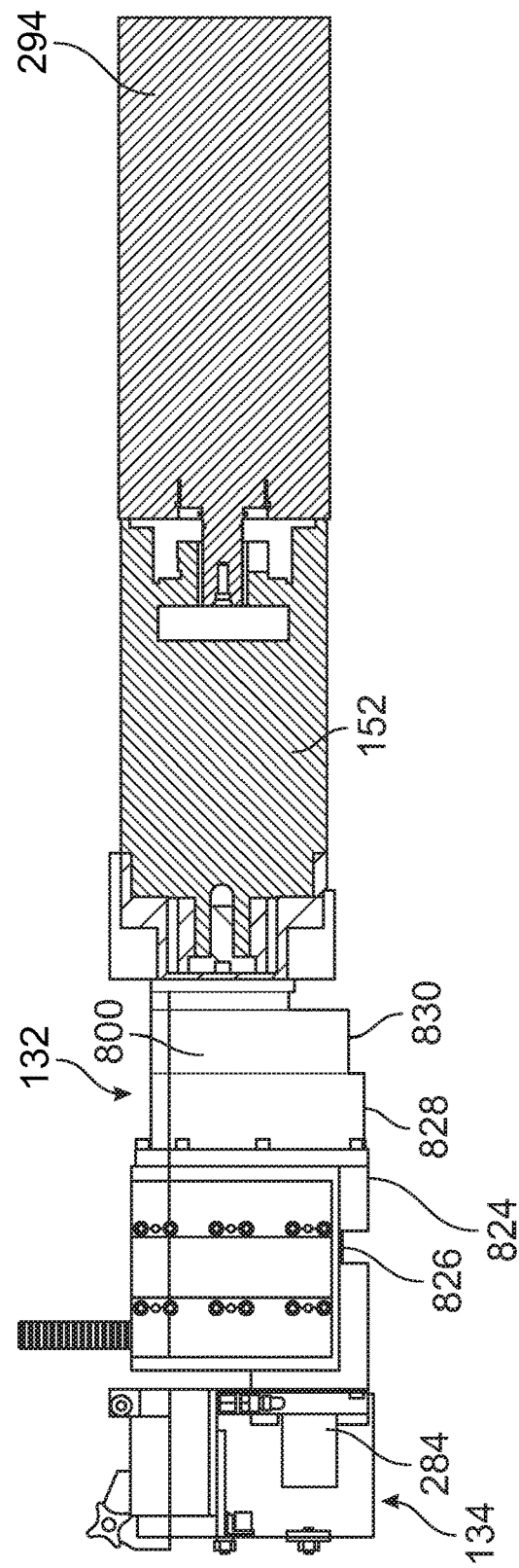
FIG. 26 depicts another cross-sectional view of the gearbox assembly of FIG. 23.
Figure 27:
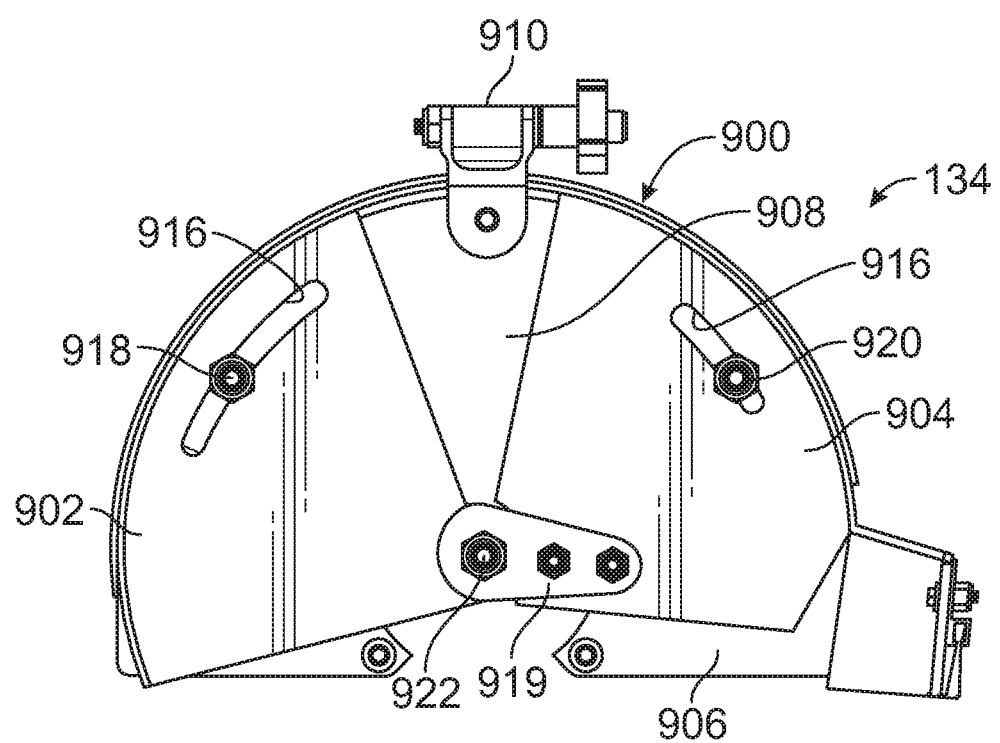
FIG. 27 depicts an elevational view of a guard assembly which forms part of the travelling pipe cutter.
Figure 28:
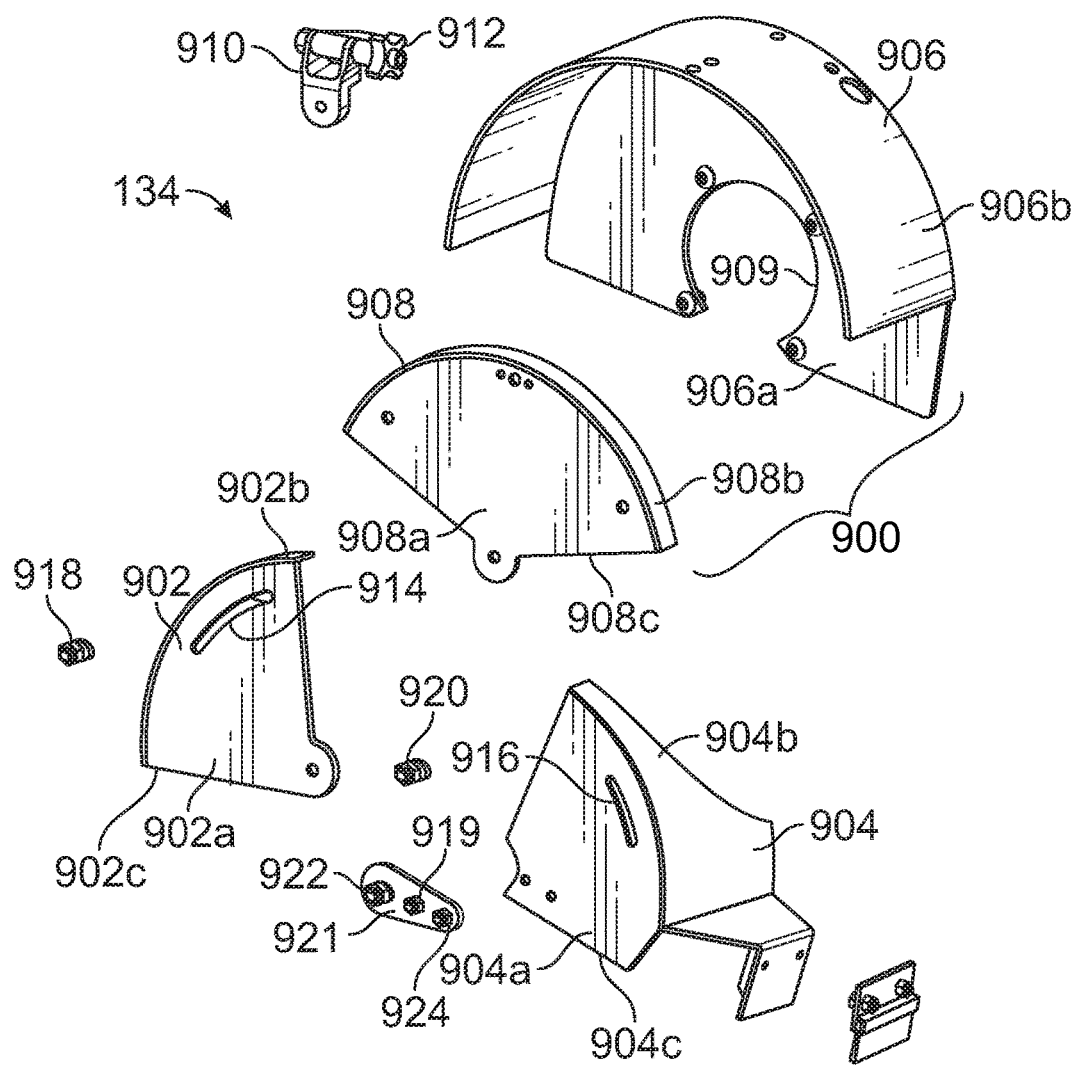
FIG. 28 depicts an exploded, perspective view of the guard assembly of FIG. 27.

A circular nut 818 is positioned on the spindle 284 to hold the bearings 814, 816 and gears 810, 812 onto the spindle 284. The circular nut 818 abuts against the bearings 814. As shown in FIG. 25, the nut 818 has a recess 820 therein in which a seal 822 is mounted. The seal 822 seats completely within the recess 820.

Suitable O-rings are provided in the gearbox assembly 132 to seal the gearbox assembly 132 to prevent the leakage of internal lubrication fluids.

The housing 800 has an inner surface 824 of which is generally planar, with the exception of first, second and third recessed portions 826, 828, 830 in its external surface. The first recessed portion 826 is provided between the helical gear 810 and the roller bearings 816. The internal surface of the housing 800 at this first recessed portion 826 abuts against the spindle 284. The first recessed portion 826 is sufficiently far along the length of the spindle 284 that the weight of the cutting tool 270 does not impact the structural strength of the housing 800 at this first recessed portion 826. The second recessed portion 828 is provided proximate to the helical gear 812. The internal surface of the housing 800 at this second recessed portion 830 abuts against the helical gear 812. The third recessed portion 830 is provided between the helical gear 812 and proximate to the needle roller bearing 814 which is proximate to the helical gear 812. The internal surface of the housing 800 at this third recessed portion 830 abuts against the needle roller bearing 814. The second and third recessed portions 828, 830 are distant from the cutting tool 270, such that the weight of the cutting tool 270 does not impact the structural strength of the housing 800 at these recessed portions 828, 830.

In use, the motor 294 engages the change gear box 152 which drives the gearbox assembly 132. In the gearbox assembly 132, the drive shaft 802 is rotated by this engagement which rotates the right-hand and left-hand helical gears 804, 806 mounted thereon. The rotation of the right-hand and left-hand helical gears 804, 806 on the drive shaft 802 causes the rotation of the right-hand and left-hand helical gears 810, 812 on the spindle 284, thereby rotating the cutting tool 270.

Figure 24:
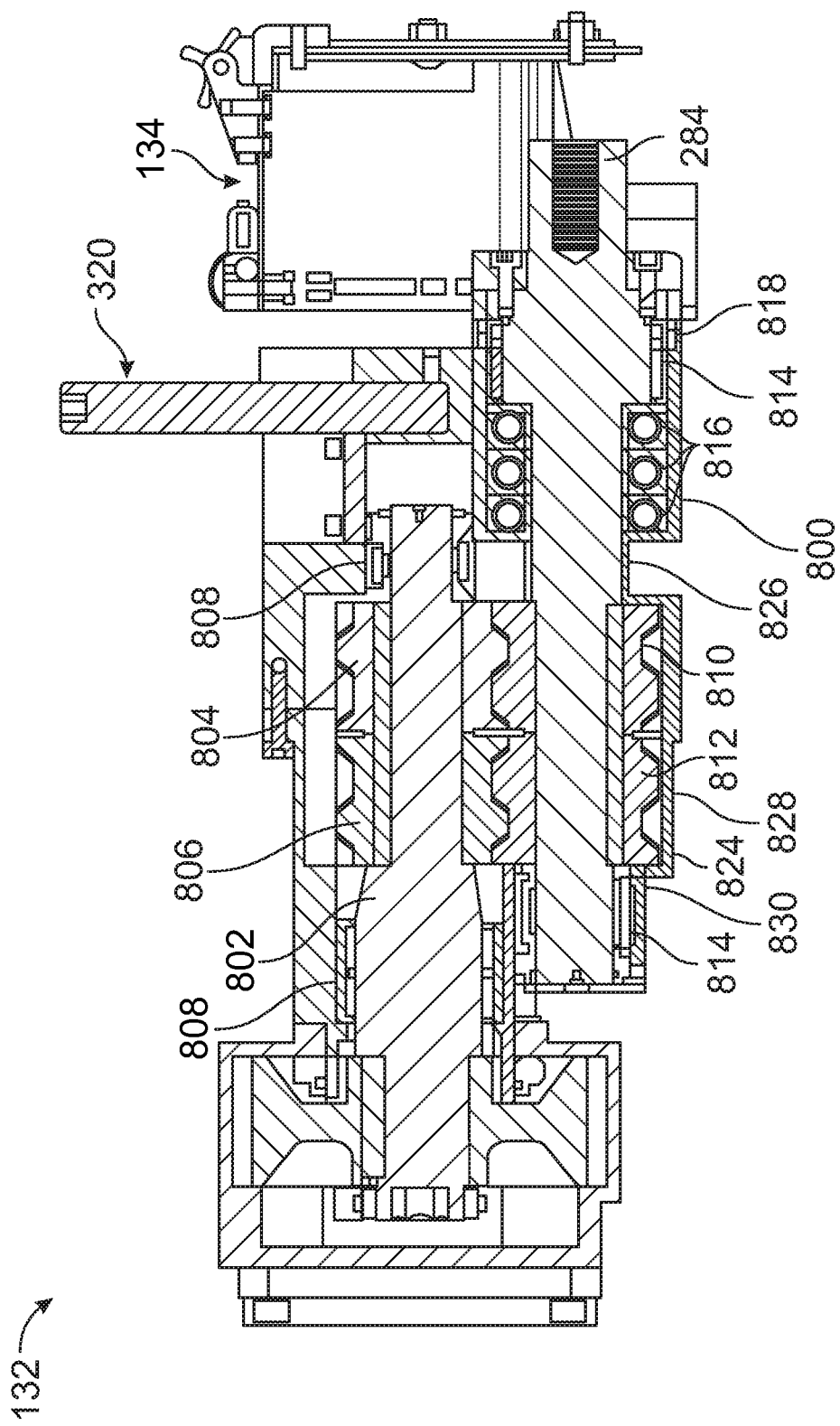
FIG. 24 depicts a cross-sectional view of the gearbox assembly of FIG. 23.

With reference to FIG. 24, the travelling pipe cutter 100 includes the adjustment mechanism 320 to lower or raise the spindle 284 and associated the cutting tool 270, along with the gearbox assembly 132, in a vertical direction away from or a vertical direction towards the outer surface of the hollow vessel 120. The adjustment mechanism 320 can be rotated using a tool such as, for example, a power tool, drill or a hand ratchet wrench, either clockwise or counterclockwise, to move the spindle 284 and associated the cutting tool 270, along with the gearbox assembly 132 in a direction away from or a direction towards the outer surface of the hollow vessel 120 depending on the direction of rotation of the adjustment mechanism 320. When the spindle 284 and associated the cutting tool 270, along with the gearbox assembly 132 are moved toward the outer surface of the hollow vessel 120, the inner surface 824 of the housing 800 of the gearbox assembly 132 can engage with the base plate 142 of the inner carriage 136. When the inner surface 824 of the housing 800 engages with the base plate 142, the bridge portion 141 seats against the first recessed portion 826 such that the bridge portion 141 seats within the recess formed by the first recessed portion 826, the second recessed portion 828 seats within the aperture 139 and the third recessed portion 830 seats against the recess 135. That is, the inner surface 824 of the housing 800 is formed such that a portions passes through the base plate 142 and portions abut against the outer surface 142b of the base plate 142. This allows for the even further travel of the spindle 284 and associated the cutting tool 270, along with the gearbox assembly 132, relative to the inner carriage 136 and allows for a smaller dimensional height, thereby reducing the overall profile of the travelling pipe cutter 100. In addition, the use of needle roller bearings 808, 814, the use of the right-hand and left-hand helical gears 804, 806, 810, 812, and the provision of the seal 822 seated within the nut 818 allows the gearbox assembly 132 to have a smaller dimensional height, thereby reducing the overall profile of the travelling pipe cutter 100.

As shown in FIG. 1, the guard assembly 134 for the cutting tool 270 is mounted on the side wall 145 of the housing 143 of the inner carriage 136. As best shown in FIGS. 27-31, the guard assembly 134 includes a housing 900 and a pair of guards 902, 904 which are moveable relative to the housing 900. The guards 902, 904 are moveable to expose more the cutting tool 270 as the cutting tool 270 is moved toward the hollow vessel 120.

The housing 900 is formed of a first part 906 which is connected to a second part 908 by a hinge 910. The first and second parts 906, 908 form a cavity having an open end in which the cutting tool 270 seats as shown in FIG. 1.

The first part 906 has an upright wall 906a with a flange 906b extending outwardly therefrom. The flange 906b extends around the outer end of the upright wall 906a, and partially around the side edges of the upright wall 906a. The inner end of the upright wall 906a has an aperture 909 therein through which the spindle 284 of the cutting tool 270 extends. The second part 908 includes an upright wall 908a with a flange 908b extending outwardly therefrom. The flanges 906b, 908b abut against each other. The flanges 906b, 908b may be arcuate to mimic the shape of the perimeter of the cutting tool 270.

Figure 31:
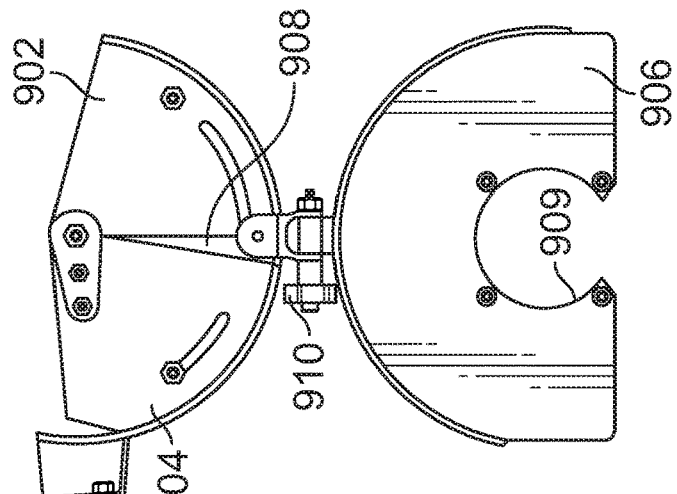
FIGS. 29-31 depict side elevation views of the guard assembly of FIG. 27 in an open position.
Figure 30:
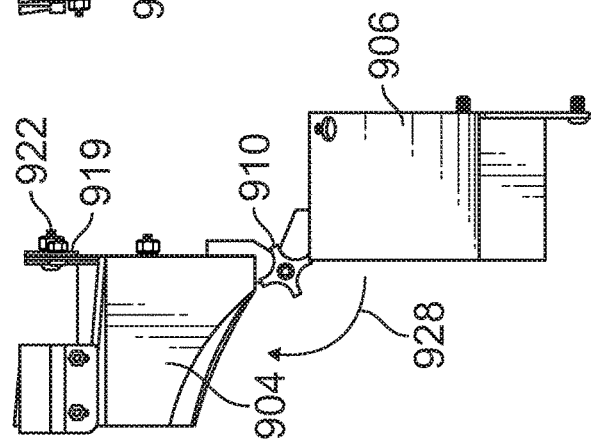
Figure 29:
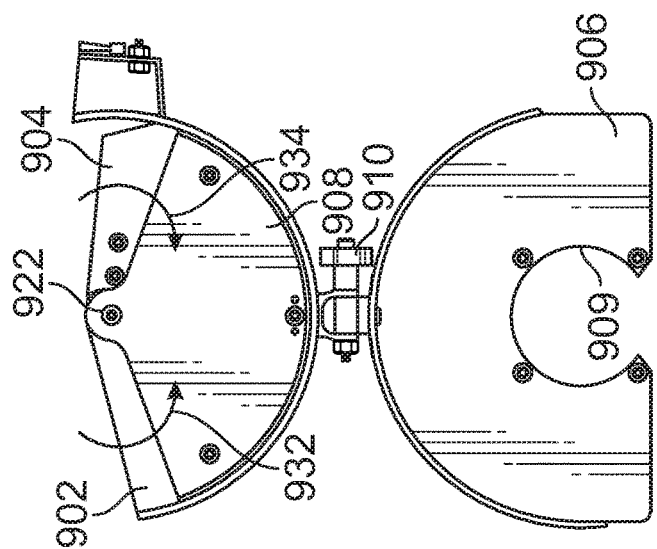

The hinge 910 is connected to the outer ends of the first and second parts 906, 908 such that the second part 908 can be rotated outwardly relative to the first part 906 as shown in FIGS. 29-31. The hinge 910 may include a lock 912 for locking the hinge 910 into position such that rotation of the second part 908 relative to the first part 906 is prevented.

The guards 902, 904 are attached to the second part 908 and moveable relative thereto to make the cavity larger or smaller. Each guard 902, 904 includes a generally pie-shaped side wall 902a, 904a with a flange 902b, 904b extending from the outer edges thereof. The flanges 902b, 904b overlay the flange 908b of the second part 908. As shown, each pie-shaped side wall 902a, 904a has an arcuate slot 914, 916 therethrough and a screw or pin 918, 920 is attached to the respective pie-shaped side wall 902a, 904a. The screws or pins 918, 920 extend through the slots 914, 916 and prevent the release of the guards 902, 904 from the second part 908. The guards 902, 904 can slide relative to the second part 908 with the screws or pins 918, 920 sliding along the slots 914, 916. It is to be understood that the screws or pins 918, 920 may be provided through the guards 902, 904 and the slots 914, 916 provided in the second part 908. As shown, guard 904 is attached to the upright wall 908a of the second part 908 by a hinge 919. The hinge 919 may be formed of a plate 921 attached to the second part 908 by a fastener 922 and attached to the guard 904 by at least one fastener 924. The plate 921 abuts against the outer surface of the upright wall 904a. The heads of the fasteners 924 will engage with the inner edge 908c of the second part 908 to prevent the further rotation of the guard 904 relative to the second part 908. If desired, a second hinge (not shown) can be attached between the second part 908 and the guard 902.

The second part 908 and its attached guards 902, 904 can be rotated in a first direction 928 around the axis of the hinge 910 relative to the first part 906 to open the guard assembly 134 in order to service the cutting tool 270 housed within the cavity. The second part 908 and its attached guards 902, 904 can be rotated in a second, opposite direction to that of direction 928 around the axis of the hinge 910 relative to the first part 906 to close the guard assembly 134 in order to perform a cutting operation.

During a cutting operation, as the cutting tool 270 is moved in direction toward the hollow vessel 120, the inner edges 902c, 904c of the guards 902, 904 engage the outer surface of the hollow vessel 120, and the guards 902, 904 rotate relative to the second part 908 in the directions 932, 934, see FIG. 29, around the axis of the hinge 919 formed by fastener 922. This exposes more the cutting tool 270. As the cutting tool 270 is moved in direction away from the outer surface of the hollow vessel 120, the guards 902, 904 move away from the outer surface of the hollow vessel 120 and rotate relative to the second part 908 in the directions opposite to directions 932, 934 to cover the cutting tool 270. This ensure that the cutting tool 270 is covered during operation to prevent accessing the cutting tool 270 during operation.

An exemplary set-up and assembly of the track assembly 230 and travelling pipe cutter 100 is described. The track assembly 230 and travelling pipe cutter 100 may be set-up and assembled in a variety of different manners and all of such manners are intended to be within the spirit and scope of the present disclosure.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A travelling pipe cutter adapted to perform at least one of cutting and beveling a hollow vessel while traveling around the hollow vessel, comprising:
   an inner carriage;
   a plurality of wheels mounted on the inner carriage configured to provide translation of the travelling pipe cutter around the hollow vessel;
   an outer carriage;
   a force adjustment assembly attaching the inner carriage to the outer carriage and configured to allow for the vertical movement of the outer carriage relative to the inner carriage, the force adjustment assembly comprising:
     a guide wheel adjuster rigidly attached to the inner carriage and pivotally attached to the outer carriage, the guide wheel adjuster being adjustable to vary a vertical position of the outer carriage relative to the inner carriage, and
     a guide wheel spring pivotally attached to the inner carriage and pivotally attached to the outer carriage, the guide wheel spring comprising an inner housing, an outer housing and a spring mounted therein, the outer housing configured to telescope relative to the inner housing, the spring limiting the amount of travel of the outer housing relative to the inner housing; and
   a cutting tool mounted on the inner carriage and adapted for rotation relative to the inner carriage to cut the hollow vessel as the travelling pipe cutter travels around the hollow vessel.

2. The travelling pipe cutter of claim 1, wherein the guide wheel adjuster is in a forward position relative to a direction of travel of the travelling pipe cutter around the hollow vessel.

3. The travelling pipe cutter of claim 2, wherein the guide wheel spring is in a rearward position relative to the direction of travel of the travelling pipe cutter around the hollow vessel.

4. The travelling pipe cutter of claim 1, wherein the guide wheel spring has indicia thereon which provides an operator of a visual indication of an amount of force being applied to the travelling pipe cutter.

5. The travelling pipe cutter of claim 4, wherein the spring mounted in the outer housing comprises a plurality of Belleville washers.

6. The travelling pipe cutter of claim 4, wherein the guide wheel adjuster comprises a guide wheel housing rigidly attached to the inner carriage, a sleeve mounted within the guide wheel housing and pivotally connected to the outer carriage, a shank threadedly engaged with the sleeve and which is linearly fixed relative to the guide wheel housing, wherein upon rotation of the shank causes rotation of the sleeve and causes a vertical displacement of the outer carriage relative to the inner carriage.

7. The travelling pipe cutter of claim 6, wherein the guide wheel adjuster has indicia thereon which provides an operator of a visual indication of the vertical position of the outer carriage relative to the inner carriage.

8. The travelling pipe cutter of claim 6, wherein the indicia is on the sleeve and the guide wheel housing includes a window through which the indicia on the sleeve is visible.

9. The travelling pipe cutter of claim 4, wherein the indicia on the guide wheel spring is provided on the outer housing and the inner housing has a window therein through which the indicia can be viewed when the outer housing telescopes relative to the inner housing.

10. The travelling pipe cutter of claim 1, wherein the guide wheel adjuster comprises a housing rigidly attached to the inner carriage, a sleeve mounted within the housing and pivotally connected to the outer carriage, a shank threadedly engaged with the sleeve and which is linearly fixed relative to the housing, wherein upon rotation of the shank causes rotation of the sleeve and causes a vertical displacement of the outer carriage relative to the inner carriage.

11. The travelling pipe cutter of claim 1, wherein the outer carriage further comprises a plurality of wheels adapted to be connected to a feed cable and a plurality of wheels adapted to be connected to a tension cable.

12. The travelling pipe cutter of claim 1, further comprising a guard assembly on the inner carriage, the guard assembly comprising a guard housing, the cutting tool mounted within the guard housing, and first and second guards pivotably attached to the guard housing to expose more of the cutting tool when the outer carriage moves vertically toward the inner carriage or to cover more of the cutting tool when the outer carriage moves vertically away from the inner carriage.

13. The travelling pipe cutter as defined in claim 12, wherein the guard housing is formed from first and second parts which define a cavity therebetween in which the cutting tool is positioned, the first part being rigidly attached to the inner carriage, and the second part being pivotable relative to the first part, the first and second guards being mounted on the second part and being pivotable relative to the second part.

14. The travelling pipe cutter as defined in claim 13, wherein one of the second part and the first guard has a first pin mounted thereon and the other of second part and the first guard has a first slot therethrough, wherein the first pin slides along the first slot when the first guard is pivoted in either direction, and wherein one of the second part and the second guard has a second pin mounted thereon and the other of second part and the second guard has a second slot therethrough, wherein the second pin rides in the second slot, wherein the second pin slides along the second slot when the second guard is pivoted in either direction.

15. The travelling pipe cutter as defined in claim 13, wherein the guard housing conforms to the shape of the cutting tool.

16. The travelling pipe cutter as defined in claim 1, further comprising:
a worm gear housing mounted on the outer carriage;
a driven worm gear mounted in the worm gear housing;
a bearing attached to the worm gear and to the worm gear housing, the bearing configured to provide relative rotation between the worm gear housing and the worm gear;
a capstan attached to the worm gear, the capstan being rotationally fixed to the worm gear, the capstan comprising a base wall having a skirt depending therefrom, the skirt defining a generally concave recess in a side of the which faces the worm gear housing;
wherein the bearing, a portion of the worm gear and a portion of the worm gear housing seat within the capstan recess; and
at least one roller mounted on the outer carriage which receives a cable, the cable also interacting with the capstan.

17. The travelling pipe cutter as defined in claim 16, wherein an outer surface of the skirt of the capstan is cylindrical.

18. The travelling pipe cutter as defined in claim 17, further comprising a pair of spaced apart flanges extending outwardly from the skirt.

19. The travelling pipe cutter as defined in claim 16, wherein an outer surface of the skirt of the capstan is formed from a pair of angled walls.

20. The travelling pipe cutter as defined in claim 19, wherein the angled walls form a V-shape.

21. The travelling pipe cutter as defined in claim 19, wherein the angled walls have an included angle of 170 degrees.

22. The travelling pipe cutter as defined in claim 16, wherein the worm gear is driven by a motor connected to, and driving, a worm gear shaft by a gearbox.

23. The travelling pipe cutter as defined in claim 16, wherein the cutting tool is mounted on a gearbox assembly attached to the inner carriage, and a vertical position of the gearbox assembly is adjustable relative to the inner carriage, the gearbox assembly includes a plurality of recesses in a surface thereof that faces the inner carriage, and the inner carriage comprises a plate having a plurality of apertures therethrough, wherein when the vertical position of the gearbox assembly is adjusted such that the surface of the gearbox assembly engages the plate of the inner carriage, a portion of the gearbox assembly passes through the apertures in the plate of the inner carriage.

24. The travelling pipe cutter as defined in claim 23, wherein the plate further comprises a recess therein, wherein when the vertical position of the gearbox assembly is adjusted such that the surface of the gearbox assembly engages the plate of the inner carriage, a portion of the surface of the gearbox assembly seats within the recess of the plate.

25. The travelling pipe cutter as defined in claim 1, further comprising:
a spindle housing mounted on the inner carriage;
a first spindle mounted in the spindle housing;

a left-hand gear and a right-hand gear mounted on the first spindle and adapted for rotation with the first spindle;
a motor mounted on the inner carriage and adapted to rotate the first spindle, the left-hand gear and the right-hand gear;
a second spindle mounted in the spindle housing, wherein the cutting tool is mounted on the second spindle;
a left-hand gear and a right-hand gear mounted on the second spindle and adapted for rotation with the second spindle,
the left-hand gear on the first spindle intermeshes with the right-hand gear on the second spindle, and the right-hand gear on the first spindle intermeshes with the left-hand gear on the second spindle;
a plurality of needle roller bearings engaging the second spindle and the spindle housing; and
a nut positioned on the second spindle to hold the bearings and gears onto the second spindle, the nut having a recess therein in which a seal is mounted.

26. The travelling pipe cutter as defined in claim 25, wherein the seal seats completely within the recess.

27. The travelling pipe cutter as defined in claim 25, wherein a vertical position of the spindle housing is adjustable relative to the inner carriage, the spindle housing includes a plurality of recesses in a surface thereof that faces the inner carriage, and the inner carriage comprises a plate having a plurality of apertures therethrough, wherein when the vertical position of the spindle housing is adjusted such that the surface of the spindle housing engages the plate of the inner carriage, a portion of the spindle housing passes through the apertures in the plate of the inner carriage.

28. The travelling pipe cutter as defined in claim 27, wherein the plate further comprises a recess therein, wherein when the vertical position of the spindle housing is adjusted such that the surface of the spindle housing engages the plate of the inner carriage, a portion of the surface of the spindle housing seats within the recess of the plate.

* * * * *